US012469501B2

(12) United States Patent
Gao et al.

(10) Patent No.: US 12,469,501 B2
(45) Date of Patent: Nov. 11, 2025

(54) AUDIO ENCODING AND DECODING METHOD AND APPARATUS

(71) Applicant: HUAWEI TECHNOLOGIES CO., LTD., Guangdong (CN)

(72) Inventors: Yuan Gao, Beijing (CN); Shuai Liu, Beijing (CN); Bin Wang, Shenzhen (CN); Zhe Wang, Beijing (CN); Tianshu Qu, Beijing (CN); Jiahao Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 278 days.

(21) Appl. No.: 18/202,930

(22) Filed: May 28, 2023

(65) Prior Publication Data

US 2023/0298601 A1 Sep. 21, 2023

Related U.S. Application Data

(63) Continuation of application No. PCT/CN2021/096839, filed on May 28, 2021.

(30) Foreign Application Priority Data

Nov. 30, 2020 (CN) ......................... 202011377433.0

(51) Int. Cl.
*G10L 19/008* (2013.01)

(52) U.S. Cl.
CPC .................................. *G10L 19/008* (2013.01)

(58) Field of Classification Search
None
See application file for complete search history.

(56) References Cited

U.S. PATENT DOCUMENTS

2014/0355769 A1* 12/2014 Peters ........................ H04S 7/40 381/23
2015/0127354 A1* 5/2015 Peters ........................ H04S 3/02 704/500
2016/0088415 A1* 3/2016 Krueger ................ G10L 19/008 381/23

FOREIGN PATENT DOCUMENTS

CN 101388212 A 3/2009
CN 105637901 A 6/2016
(Continued)

OTHER PUBLICATIONS

Gao LI et al., Research on Spatial Parameter Perceptual Coding in 3D Audio Based on Virtual Sound, Jan. 15, 2020, total 135 pages.

*Primary Examiner* — Quynh H Nguyen
(74) *Attorney, Agent, or Firm* — WOMBLE BOND DICKINSON (US) LLP

(57) ABSTRACT

Audio encoding and decoding methods and apparatuses are disclosed, to reduce an amount of encoded and decoded data, so as to improve encoding and decoding efficiency. The method includes: selecting a first target virtual speaker from a preset virtual speaker set based on a first scene audio signal; generating a first virtual speaker signal based on the first scene audio signal and attribute information of the first target virtual speaker; obtaining a second scene audio signal using the attribute information of the first target virtual speaker and the first virtual speaker signal; generating a residual signal based on the first scene audio signal and the second scene audio signal; and encoding the first virtual speaker signal and the residual signal, to produce encoded signals, and writing the encoded signals into a bitstream.

14 Claims, 12 Drawing Sheets

(56) References Cited

FOREIGN PATENT DOCUMENTS

| | | | |
|---|---|---|---|
| CN | 107077852 | A | 8/2017 |
| CN | 105284131 | B | 9/2018 |
| CN | 108777837 | A | 11/2018 |
| CN | 109891503 | A | 6/2019 |
| CN | 110544484 | A | 12/2019 |
| JP | 2015532062 | A | 11/2015 |
| JP | 2015537256 | A | 12/2015 |
| JP | 2016520864 | A | 7/2016 |
| JP | 2016523377 | A | 8/2016 |
| JP | 2020527745 | A | 9/2020 |
| WO | 2013149867 | A1 | 10/2013 |

* cited by examiner

AUDIO ENCODING AND DECODING METHOD AND APPARATUS

CROSS-REFERENCE TO RELATED APPLICATION

This application is a continuation of International Application No. PCT/CN2021/096839, filed on May 28, 2021, which claims priority to Chinese Patent Application No. 202011377433.0, filed on Nov. 30, 2020. The disclosures of the aforementioned applications are hereby incorporated by reference in their entirety.

TECHNICAL FIELD

This application relates to the field of audio encoding and decoding technologies, and in particular, to an audio encoding and decoding method and apparatus.

BACKGROUND

A three-dimensional audio technology is an audio technology used to obtain, process, transmit, render, and play back a sound event and three-dimensional sound field information in the real world. The three-dimensional audio technology endows sound with a strong sense of space, encirclement, and immersion, to give people "true-to-life" extraordinary auditory experience. A higher order ambisonics (HOA) technology has a property of being independent of speaker layout in recording, encoding and playback phases, and a characteristic of rotatably playing back data in an HOA format, has higher flexibility in three-dimensional audio playback, and therefore has gained more attention and research.

To achieve better audio auditory effect, the HOA technology needs a large amount of data to record more detailed information about a sound scene. Although scene-based sampling and storage of a three-dimensional audio signal are more conducive to storage and transmission of spatial information of the audio signal, more data is generated as an HOA order increases, and the large amount of data causes difficulty in transmission and storage. Therefore, an HOA signal needs to be encoded and decoded.

Currently, there is a method for encoding and decoding multi-channel data, including: A core encoder (for example, a 16-channel encoder) of an encoder directly encodes each sound channel of an audio signal in an original scene, and then outputs a bitstream. A core decoder (for example, a 16-channel decoder) of a decoder decodes the bitstream to obtain each sound channel of an audio signal in a decoding scene.

In the foregoing multi-channel encoding and decoding method, corresponding encoders and decoders need to be adapted based on a quantity of sound channels of the audio signal in the original scene. In addition, as the quantity of the sound channels increases, problems of large data amount and high bandwidth occupation exist during bitstream compression.

SUMMARY

Embodiments of this application provide an audio encoding and decoding method and apparatus, to reduce an amount of encoded and decoded data, so as to improve encoding and decoding efficiency.

To resolve the foregoing technical problem, embodiments of this application provide the following technical solutions.

According to a first aspect, an embodiment of this application provides an audio encoding method, including:

- selecting a first target virtual speaker from a preset virtual speaker set based on a first scene audio signal;
- generating a first virtual speaker signal based on the first scene audio signal and attribute information of the first target virtual speaker;
- obtaining a second scene audio signal by using the attribute information of the first target virtual speaker and the first virtual speaker signal;
- generating a residual signal based on the first scene audio signal and the second scene audio signal; and
- encoding the first virtual speaker signal and the residual signal, and writing encoded signals into a bitstream.

In this embodiment of this application, the first target virtual speaker is first selected from the preset virtual speaker set based on the first scene audio signal; the first virtual speaker signal is generated based on the first scene audio signal and the attribute information of the first target virtual speaker; then the second scene audio signal is obtained by using the attribute information of the first target virtual speaker and the first virtual speaker signal; the residual signal is generated based on the first scene audio signal and the second scene audio signal; and finally, the first virtual speaker signal and the residual signal are encoded and written into the bitstream. In this embodiment of this application, the first virtual speaker signal can be generated based on the first scene audio signal and the attribute information of the first target virtual speaker. In addition, an audio encoder can further obtain the residual signal based on the first virtual speaker signal and the attribute information of the first target virtual speaker. The audio encoder encodes the first virtual speaker signal and the residual signal, instead of directly encoding the first scene audio signal. In this embodiment of this application, the first target virtual speaker is selected based on the first scene audio signal, and the first virtual speaker signal generated based on the first target virtual speaker can represent a sound field at a location of a listener in space. The sound field at the location is as close as possible to an original sound field when the first scene audio signal is recorded, thereby ensuring encoding quality of the audio encoder. In addition, the first virtual speaker signal and the residual signal are encoded to obtain the bitstream, and an amount of encoded data of the first virtual speaker signal is related to the first target virtual speaker, and is unrelated to a quantity of sound channels of the first scene audio signal, so that the amount of encoded data is reduced, and encoding efficiency is improved.

In an embodiment, the method further includes:

- obtaining a major sound field component from the first scene audio signal based on the virtual speaker set; and
- the selecting a first target virtual speaker from a preset virtual speaker set based on a first scene audio signal includes:
- selecting the first target virtual speaker from the virtual speaker set based on the major sound field component.

In the foregoing solution, each virtual speaker in the virtual speaker set corresponds to one sound field component, and the first target virtual speaker is selected from the virtual speaker set based on the major sound field component. For example, a virtual speaker corresponding to the major sound field component is the first target virtual speaker selected by the encoder. In this embodiment of this application, the encoder can select the first target virtual speaker based on the major sound field component, to resolve a problem that the encoder needs to determine the first target virtual speaker.

In an embodiment, the selecting the first target virtual speaker from the virtual speaker set based on the major sound field component includes:

selecting an HOA coefficient for the major sound field component from a higher order ambisonics HOA coefficient set based on the major sound field component, where HOA coefficients in the HOA coefficient set are in a one-to-one correspondence with virtual speakers in the virtual speaker set; and determining a virtual speaker corresponding to the HOA coefficient for the major sound field component in the virtual speaker set as the first target virtual speaker.

In the foregoing solution, the encoder pre-configures the HOA coefficient set based on the virtual speaker set, and there is the one-to-one correspondence between the HOA coefficients in the HOA coefficient set and the virtual speakers in the virtual speaker set. Therefore, after the HOA coefficient is selected based on the major sound field component, the virtual speaker set is searched for, based on the one-to-one correspondence, a target virtual speaker corresponding to the HOA coefficient for the major sound field component, and the found target virtual speaker is the first target virtual speaker. This resolves a problem that the encoder needs to determine the first target virtual speaker.

In an embodiment, the selecting the first target virtual speaker from the virtual speaker set based on the major sound field component includes:

obtaining a configuration parameter of the first target virtual speaker based on the major sound field component;

generating an HOA coefficient for the first target virtual speaker based on the configuration parameter of the first target virtual speaker; and determining a virtual speaker corresponding to the HOA coefficient for the first target virtual speaker in the virtual speaker set as the first target virtual speaker.

In the foregoing solution, after obtaining the major sound field component, the encoder can determine the configuration parameter of the first target virtual speaker based on the major sound field component. For example, the major sound field component is one or more sound field components with a largest value in a plurality of sound field components, or the major sound field component may be one or more sound field components with a dominant direction in a plurality of sound field components. The major sound field component can be used to determine the first target virtual speaker matching the first scene audio signal, corresponding attribute information is configured for the first target virtual speaker, and an HOA coefficient for the first target virtual speaker can be generated based on the configuration parameter of the first target virtual speaker. A process of generating the HOA coefficient can be implemented by using an HOA algorithm, and details are not described herein again. Each virtual speaker in the virtual speaker set corresponds to an HOA coefficient. Therefore, the first target virtual speaker can be selected from the virtual speaker set based on the HOA coefficient for each virtual speaker, to resolve a problem that the encoder needs to determine the first target virtual speaker.

In an embodiment, the obtaining a configuration parameter of the first target virtual speaker based on the major sound field component includes:

determining configuration parameters of a plurality of virtual speakers in the virtual speaker set based on configuration information of an audio encoder; and selecting the configuration parameter of the first target virtual speaker from the configuration parameters of the plurality of virtual speakers based on the major sound field component.

In the foregoing solution, the encoder obtains the configuration parameters of the plurality of virtual speakers from the virtual speaker set. For each virtual speaker, a corresponding virtual speaker configuration parameter exists, and each virtual speaker configuration parameter includes but is not limited to information such as an HOA order of the virtual speaker and location coordinates of the virtual speaker. A configuration parameter of each virtual speaker can be used to generate an HOA coefficient for the virtual speaker. A process of generating the HOA coefficient can be implemented by using an HOA algorithm, and details are not described herein again. An HOA coefficient is generated for each virtual speaker in the virtual speaker set, and the HOA coefficients respectively configured for all the virtual speakers in the virtual speaker set form the HOA coefficient set, to resolve a problem that the encoder needs to determine the HOA coefficient for each virtual speaker in the virtual speaker set.

In an embodiment, the configuration parameter of the first target virtual speaker includes location information and HOA order information of the first target virtual speaker; and the generating an HOA coefficient for the first target virtual speaker based on the configuration parameter of the first target virtual speaker includes:

determining the HOA coefficient for the first target virtual speaker based on the location information and the HOA order information of the first target virtual speaker.

In the foregoing solution, the configuration parameter of each virtual speaker in the virtual speaker set may include location information of the virtual speaker and HOA order information of the virtual speaker. Similarly, the configuration parameter of the first target virtual speaker includes the location information and the HOA order information of the first target virtual speaker. For example, location information of each virtual speaker in the virtual speaker set can be determined according to a local equidistant virtual speaker space distribution manner. The local equidistant virtual speaker space distribution manner means that a plurality of virtual speakers are distributed in space in a local equidistant manner. For example, the local equidistant manner may include even distribution or uneven distribution. Both the location information and HOA order information of each virtual speaker can be used to generate an HOA coefficient for the virtual speaker. A process of generating the HOA coefficient can be implemented by using an HOA algorithm. This resolves a problem that the encoder needs to determine the HOA coefficient for the first target virtual speaker.

In an embodiment, the method further includes:

encoding the attribute information of the first target virtual speaker, and writing encoded information into the bitstream.

In the foregoing solution, in addition to encoding a virtual speaker, the encoder can also encode the attribute information of the first target virtual speaker, and write encoded attribute information of the first target virtual speaker into the bitstream. In this case, an obtained bitstream may include an encoded virtual speaker and the encoded attribute information of the first target virtual speaker. In this embodiment of this application, the bitstream can carry the encoded attribute information of the first target virtual speaker, so that a decoder can determine the attribute information of the first target virtual speaker by decoding the bitstream, to facilitate audio decoding by the decoder.

In an embodiment, the first scene audio signal includes a higher order ambisonics HOA signal to be encoded, and the attribute information of the first target virtual speaker includes an HOA coefficient for the first target virtual speaker; and the generating a first virtual speaker signal based on the first scene audio signal and attribute information of the first target virtual speaker includes:

performing linear combination on the HOA signal to be encoded and the HOA coefficient for the first target virtual speaker to obtain the first virtual speaker signal.

In the foregoing solution, an example in which the first scene audio signal is the HOA signal to be encoded is used. The encoder first determines the HOA coefficient for the first target virtual speaker. For example, the encoder selects an HOA coefficient from the HOA coefficient set based on the major sound field component, and the selected HOA coefficient is the HOA coefficient for the first target virtual speaker. After the encoder obtains the HOA signal to be encoded and the HOA coefficient for the first target virtual speaker, the first virtual speaker signal can be generated based on the HOA signal to be encoded and the HOA coefficient for the first target virtual speaker. The HOA signal to be encoded can be obtained by performing linear combination by using the HOA coefficient for the first target virtual speaker, and solving of the first virtual speaker signal can be converted into solving of linear combination.

In an embodiment, the first scene audio signal includes a higher order ambisonics HOA signal to be encoded, and the attribute information of the first target virtual speaker includes the location information of the first target virtual speaker; and the generating a first virtual speaker signal based on the first scene audio signal and attribute information of the first target virtual speaker includes:

obtaining the HOA coefficient for the first target virtual speaker based on the location information of the first target virtual speaker; and performing linear combination on the HOA signal to be encoded and the HOA coefficient for the first target virtual speaker to obtain the first virtual speaker signal.

In the foregoing solution, after the encoder obtains the HOA signal to be encoded and the HOA coefficient for the first target virtual speaker, the encoder performs linear combination on the HOA signal to be encoded and the HOA coefficient for the first target virtual speaker. In other words, the encoder combines the HOA signal to be encoded and the HOA coefficient for the first target virtual speaker together to obtain a linear combination matrix. Then, the encoder can obtain an optimal solution of the linear combination matrix, and the obtained optimal solution is the first virtual speaker signal.

In an embodiment, the method further includes:

selecting a second target virtual speaker from the virtual speaker set based on the first scene audio signal;

generating a second virtual speaker signal based on the first scene audio signal and attribute information of the second target virtual speaker; and encoding the second virtual speaker signal, and writing an encoded signal into the bitstream; and the obtaining a second scene audio signal by using the attribute information of the first target virtual speaker and the first virtual speaker signal includes:

obtaining the second scene audio signal based on the attribute information of the first target virtual speaker, the first virtual speaker signal, the attribute information of the second target virtual speaker, and the second virtual speaker signal.

In the foregoing solution, the encoder can obtain the attribute information of the first target virtual speaker, and the first target virtual speaker is a virtual speaker that is in the virtual speaker set and that is used to play back the first virtual speaker signal. The encoder can obtain the attribute information of the second target virtual speaker, and the second target virtual speaker is a virtual speaker that is in the virtual speaker set and that is used to play back the second virtual speaker signal. The attribute information of the first target virtual speaker may include the location information of the first target virtual speaker and the HOA coefficient for the first target virtual speaker. The attribute information of the second target virtual speaker may include location information of the second target virtual speaker and an HOA coefficient for the second target virtual speaker. After the encoder obtains the first virtual speaker signal and the second virtual speaker signal, the encoder performs signal reconstruction based on the attribute information of the first target virtual speaker and the attribute information of the second target virtual speaker, and can obtain the second scene audio signal through signal reconstruction.

In an embodiment, the method further includes:

aligning the first virtual speaker signal and the second virtual speaker signal, to obtain an aligned first virtual speaker signal and an aligned second virtual speaker signal;

the encoding the second virtual speaker signal includes:

encoding the aligned second virtual speaker signal; and the encoding the first virtual speaker signal and the residual signal includes:

encoding the aligned first virtual speaker signal and the residual signal.

In the foregoing solution, after obtaining the aligned first virtual speaker signal, the encoder can encode the aligned first virtual speaker signal and the residual signal. In this embodiment of this application, inter-channel correlation is enhanced by adjusting and aligning sound channels of the first virtual speaker signal again, to facilitate encoding processing of the first virtual speaker signal by a core encoder.

In an embodiment, the method further includes:

selecting a second target virtual speaker from the virtual speaker set based on the first scene audio signal; and generating a second virtual speaker signal based on the first scene audio signal and attribute information of the second target virtual speaker; and the encoding the first virtual speaker signal and the residual signal includes:

obtaining a downmixed signal and first side information based on the first virtual speaker signal and the second virtual speaker signal, where the first side information indicates a relationship between the first virtual speaker signal and the second virtual speaker signal; and encoding the downmixed signal, the first side information, and the residual signal.

In the foregoing solution, after the encoder obtains the first virtual speaker signal and the second virtual speaker signal, the encoder can further perform downmixing based on the first virtual speaker signal and the second virtual speaker signal to generate the downmixed signal, for example, perform amplitude downmixing on the first virtual speaker signal and the second virtual speaker signal to obtain the downmixed signal. In addition, the first side information can be further generated based on the first virtual speaker signal and the second virtual speaker signal. The first side information indicates the relationship between the first virtual speaker signal and the second virtual speaker signal, and the relationship has a plurality of embodiments. The first side information can be used by the decoder to upmix the downmixed signal, to restore the first virtual speaker signal and the second virtual speaker signal. For example, the first side information includes a signal information loss analysis parameter, so that the decoder restores the first virtual speaker signal and the second virtual speaker signal by using the signal information loss analysis parameter. For another example, the first side information may be a correlation parameter between the first virtual speaker signal and the second virtual speaker signal, for example, may be an energy proportion parameter between the first virtual speaker signal and the second virtual speaker signal. Therefore, the decoder restores the first virtual speaker signal and the second virtual speaker signal by using the correlation parameter or the energy proportion parameter.

In an embodiment, the method further includes:

aligning the first virtual speaker signal and the second virtual speaker signal, to obtain an aligned first virtual speaker signal and an aligned second virtual speaker signal; and the obtaining a downmixed signal and first side information based on the first virtual speaker signal and the second virtual speaker signal includes:

obtaining the downmixed signal and the first side information based on the aligned first virtual speaker signal and the aligned second virtual speaker signal.

In an embodiment, the first side information indicates a relationship between the aligned first virtual speaker signal and the aligned second virtual speaker signal.

In the foregoing solution, before generating the downmixed signal, the encoder can first perform an alignment operation on the virtual speaker signals, and after completing the alignment operation, generate the downmixed signal and the first side information. In this embodiment of this application, inter-channel correlation is enhanced by adjusting and aligning sound channels of the first virtual speaker signal and the second virtual speaker signal again, to facilitate encoding processing of the first virtual speaker signal by the core encoder.

In an embodiment, before the selecting a second target virtual speaker from the virtual speaker set based on the first scene audio signal, the method further includes:

determining, based on an encoding rate and/or signal class information of the first scene audio signal, whether a target virtual speaker other than the first target virtual speaker needs to be obtained; and selecting the second target virtual speaker from the virtual speaker set based on the first scene audio signal only if the target virtual speaker other than the first target virtual speaker needs to be obtained.

In the foregoing solution, the encoder can further select a signal to determine whether the second target virtual speaker needs to be obtained. When the second target virtual speaker needs to be obtained, the encoder may generate the second virtual speaker signal. When the second target virtual speaker does not need to be obtained, the encoder may not generate the second virtual speaker signal. The encoder can determine, based on the configuration information of the audio encoder and/or the signal class information of the first scene audio signal, whether another target virtual speaker needs to be selected in addition to the first target virtual speaker. For example, if the encoding rate is higher than a preset threshold, it is determined that target virtual speakers corresponding to two major sound field components need to be obtained, and in addition to that the first target virtual speaker is determined, the second target virtual speaker may be further determined. For another example, if it is determined, based on the signal class information of the first scene audio signal, that target virtual speakers corresponding to two major sound field components including a dominant sound source direction need to be obtained, in addition to that the first target virtual speaker is determined, the second target virtual speaker may be further determined. On the contrary, if it is determined, based on the encoding rate and/or the signal class information of the first scene audio signal, that only one target virtual speaker needs to be obtained, after the first target virtual speaker is determined, it is determined that no target virtual speaker other than the first target virtual speaker is obtained. In this embodiment of this application, a signal is selected, so that an amount of data encoded by the encoder can be reduced, to improve encoding efficiency.

In an embodiment, the residual signal includes residual sub-signals on at least two sound channels, and the method further includes:

determining, from the residual sub-signals on the at least two sound channels based on the configuration information of the audio encoder and/or the signal class information of the first scene audio signal, a residual sub-signal that needs to be encoded and that is on at least one sound channel; and the encoding the first virtual speaker signal and the residual signal includes:

encoding the first virtual speaker signal and the residual sub-signal that needs to be encoded and that is on the at least one sound channel.

In the foregoing solution, the encoder can make a decision on the residual signal based on the configuration information of the audio encoder and/or the signal class information of the first scene audio signal. For example, if the residual signal includes the residual sub-signals on the at least two sound channels, the encoder can select a sound channel or sound channels on which residual sub-signals need to be encoded and a sound channel or sound channels on which residual sub-signals do not need to be encoded. For example, a residual sub-signal with dominant energy in the residual signal is selected based on the configuration information of the audio encoder for encoding. For another example, a residual sub-signal obtained through calculation by a low-order HOA sound channel in the residual signal is selected based on the signal class information of the first scene audio signal for encoding. For the residual signal, a sound channel is selected, so that an amount of data encoded by the encoder can be reduced, to improve encoding efficiency.

In an embodiment, if the residual sub-signals on the at least two sound channels include a residual sub-signal that does not need to be encoded and that is on at least one sound channel, the method further includes:

obtaining second side information, where the second side information indicates a relationship between the residual sub-signal that needs to be encoded and that is on the at least one sound channel and the residual sub-signal that does not need to be encoded and that is on the at least one sound channel; and writing the second side information into the bitstream.

In the foregoing solution, when selecting a signal, the encoder can determine the residual sub-signal that needs to be encoded and the residual sub-signal that does not need to be encoded. In this embodiment of this application, the residual sub-signal that needs to be encoded is encoded, and the residual sub-signal that does not need to be encoded is not encoded, so that an amount of data encoded by the encoder can be reduced, to improve encoding efficiency. Because information loss occurs when the encoder selects the signal, signal compensation needs to be performed on a residual sub-signal that is not transmitted. The signal compensation may be and is not limited to information loss analysis, energy compensation, envelope compensation, and noise compensation. A compensation method may be linear compensation, nonlinear compensation, or the like. After signal compensation, second side information may be generated, and the second side information may be written into the bitstream. The second side information indicates a relationship between a residual sub-signal that needs to be encoded and a residual sub-signal that does not need to be encoded. The relationship has a plurality of embodiments. For example, the second side information includes a signal information loss analysis parameter, so that the decoder restores, by using the signal information loss analysis parameter, the residual sub-signal that needs to be encoded and the residual sub-signal that does not need to be encoded. For another example, the second side information may be a correlation parameter between the residual sub-signal that needs to be encoded and the residual sub-signal that does not need to be encoded, for example, may be an energy proportion parameter between the residual sub-signal that needs to be encoded and the residual sub-signal that does not need to be encoded. Therefore, the decoder restores, by using the correlation parameter or the energy proportion parameter, the residual sub-signal that needs to be encoded and the residual sub-signal that does not need to be encoded. In this embodiment of this application, the decoder can obtain the second side information by using the bitstream, and the decoder can perform signal compensation based on the second side information, to improve quality of a decoded signal of the decoder.

According to a second aspect, an embodiment of this application further provides an audio decoding method, including:

receiving a bitstream;

decoding the bitstream to obtain a virtual speaker signal and a residual signal; and obtaining a reconstructed scene audio signal based on attribute information of a target virtual speaker, the residual signal, and the virtual speaker signal.

In this embodiment of this application, the bitstream is first received, then the bitstream is decoded to obtain the virtual speaker signal and the residual signal, and finally the reconstructed scene audio signal is obtained based on the attribute information of the target virtual speaker, the residual signal, and the virtual speaker signal. In this embodiment of this application, an audio decoder performs a decoding process that is reverse to the encoding process by the audio encoder, and can obtain the virtual speaker signal and the residual signal from the bitstream through decoding, and obtain the reconstructed scene audio signal by using the attribute information of the target virtual speaker, the residual signal, and the virtual speaker signal. In this embodiment of this application, the obtained bitstream carries the virtual speaker signal and the residual signal, to reduce an amount of decoded data and improve decoding efficiency.

In an embodiment, the method further includes:

decoding the bitstream to obtain the attribute information of the target virtual speaker.

In the foregoing solution, in addition to encoding a virtual speaker, the encoder can also encode the attribute information of the target virtual speaker, and write encoded attribute information of the target virtual speaker into the bitstream. For example, attribute information of a first target virtual speaker can be obtained by using the bitstream. In this embodiment of this application, the bitstream can carry encoded attribute information of the first target virtual speaker, so that the decoder can determine the attribute information of the first target virtual speaker by decoding the bitstream, to facilitate audio decoding by the decoder.

In an embodiment, the attribute information of the target virtual speaker includes a higher order ambisonics HOA coefficient for the target virtual speaker; and the obtaining a reconstructed scene audio signal based on attribute information of a target virtual speaker, the residual signal, and the virtual speaker signal includes:

performing synthesis processing on the virtual speaker signal and the HOA coefficient for the target virtual speaker to obtain a synthesized scene audio signal; and adjusting the synthesized scene audio signal by using the residual signal to obtain the reconstructed scene audio signal.

In the foregoing solution, the decoder first determines the HOA coefficient for the target virtual speaker. For example, the decoder may pre-store the HOA coefficient for the target virtual speaker. After obtaining the virtual speaker signal and the HOA coefficient for the target virtual speaker, the decoder can obtain the synthesized scene audio signal based on the virtual speaker signal and the HOA coefficient for the target virtual speaker. Finally, the residual signal is used to adjust the synthesized scene audio signal, to improve quality of the reconstructed scene audio signal.

In an embodiment, the attribute information of the target virtual speaker includes location information of the target virtual speaker; and the obtaining a reconstructed scene audio signal based on attribute information of a target virtual speaker, the residual signal, and the virtual speaker signal includes:

determining an HOA coefficient for the target virtual speaker based on the location information of the target virtual speaker;

performing synthesis processing on the virtual speaker signal and the HOA coefficient for the target virtual speaker to obtain a synthesized scene audio signal; and adjusting the synthesized scene audio signal by using the residual signal to obtain the reconstructed scene audio signal.

In the foregoing solution, the attribute information of the target virtual speaker may include the location information of the target virtual speaker. The decoder pre-stores an HOA coefficient for each virtual speaker in a virtual speaker set, and the decoder further stores location information of each virtual speaker. For example, the decoder can determine, based on a correspondence between location information of a virtual speaker and an HOA coefficient for the virtual speaker, the HOA coefficient for the location information of the target virtual speaker, or the decoder can calculate the HOA coefficient for the target virtual speaker based on the location information of the target virtual speaker. Therefore, the decoder can determine the HOA coefficient for the target virtual speaker based on the location information of the target virtual speaker. This resolves a problem that the decoder needs to determine the HOA coefficient for a target virtual speaker.

In an embodiment, the virtual speaker signal is a downmixed signal obtained by downmixing a first virtual speaker signal and a second virtual speaker signal, and the method further includes:

decoding the bitstream to obtain first side information, where the first side information indicates a relationship between the first virtual speaker signal and the second virtual speaker signal; and obtaining the first virtual speaker signal and the second virtual speaker signal based on the first side information and the downmixed signal; and the obtaining a reconstructed scene audio signal based on attribute information of a target virtual speaker, the residual signal, and the virtual speaker signal includes:

obtaining the reconstructed scene audio signal based on the attribute information of the target virtual speaker, the residual signal, the first virtual speaker signal, and the second virtual speaker signal.

In the foregoing solution, the encoder generates the downmixed signal when performing downmixing based on the first virtual speaker signal and the second virtual speaker signal, and the encoder can further perform signal compensation for the downmixed signal, to generate the first side information. The first side information can be written into the bitstream. The decoder can obtain the first side information by using the bitstream. The decoder can perform signal compensation based on the first side information, to obtain the first virtual speaker signal and the second virtual speaker signal. Therefore, during signal reconstruction, the first virtual speaker signal, the second virtual speaker signal, the attribute information of the target virtual speaker, and the residual signal can be used, to improve quality of a decoded signal of the decoder.

In an embodiment, the residual signal includes a residual sub-signal on a first sound channel, and the method further includes:

decoding the bitstream to obtain second side information, where the second side information indicates a relationship between the residual sub-signal on the first sound channel and a residual sub-signal on a second sound channel; and obtaining the residual sub-signal on the second sound channel based on the second side information and the residual sub-signal on the first sound channel; and the obtaining a reconstructed scene audio signal based on attribute information of a target virtual speaker, the residual signal, and the virtual speaker signal includes:

obtaining the reconstructed scene audio signal based on the attribute information of the target virtual speaker, the residual sub-signal on the first sound channel, the residual sub-signal on the second sound channel, and the virtual speaker signal.

In the foregoing solution, when selecting a signal, the encoder can determine a residual sub-signal that needs to be encoded and a residual sub-signal that does not need to be encoded. Because information loss occurs when the encoder selects the signal, the encoder generates the second side information. The second side information can be written into the bitstream. The decoder can obtain the second side information by using the bitstream. It is assumed that the residual signal carried in the bitstream includes the residual sub-signal on the first sound channel, the decoder can perform signal compensation based on the second side information to obtain the residual sub-signal on the second sound channel. For example, the decoder restores the residual sub-signal on the second sound channel by using the residual sub-signal on the first sound channel and the second side information. The second sound channel is independent of the first sound channel. Therefore, during signal reconstruction, the residual sub-signal on the first sound channel, the residual sub-signal on the second sound channel, the attribute information of the target virtual speaker, and the virtual speaker signal can be used, to improve quality of a decoded signal of the decoder.

In an embodiment, the residual signal includes a residual sub-signal on a first sound channel, and the method further includes:

decoding the bitstream to obtain second side information, where the second side information indicates a relationship between the residual sub-signal on the first sound channel and a residual sub-signal on a third sound channel; and obtaining the residual sub-signal on the third sound channel and an updated residual sub-signal on the first sound channel based on the second side information and the residual sub-signal on the first sound channel; and the obtaining a reconstructed scene audio signal based on attribute information of a target virtual speaker, the residual signal, and the virtual speaker signal includes:

obtaining the reconstructed scene audio signal based on the attribute information of the target virtual speaker, the updated residual sub-signal on the first sound channel, the residual sub-signal on the third sound channel, and the virtual speaker signal.

In the foregoing solution, when selecting a signal, the encoder can determine a residual sub-signal that needs to be encoded and a residual sub-signal that does not need to be encoded. Because information loss occurs when the encoder selects the signal, the encoder generates the second side information. The second side information can be written into the bitstream. The decoder can obtain the second side information by using the bitstream. It is assumed that the residual signal carried in the bitstream includes the residual sub-signal on the first sound channel, the decoder can perform signal compensation based on the second side information to obtain the residual sub-signal on the third sound channel. The residual sub-signal on the third sound channel is different from the residual sub-signal on the first sound channel. When the residual sub-signal on the third sound channel is obtained based on the second side information and the residual sub-signal on the first sound channel, the residual sub-signal on the first sound channel needs to be updated, to obtain the updated residual sub-signal on the first sound channel. For example, the decoder generates the residual sub-signal on the third sound channel and the updated residual sub-signal on the first sound channel by using the residual sub-signal on the first sound channel and the second side information. Therefore, during signal reconstruction, the residual sub-signal on the third sound channel, the updated residual sub-signal on the first sound channel, the attribute information of the target virtual speaker, and the virtual speaker signal can be used, to improve quality of a decoded signal of the decoder.

According to a third aspect, an embodiment of this application provides an audio encoding apparatus, including:

an obtaining module, configured to select a first target virtual speaker from a preset virtual speaker set based on a first scene audio signal;

a signal generation module, configured to generate a virtual speaker signal based on the first scene audio signal and attribute information of the first target virtual speaker, where the signal generation module is configured to obtain a second scene audio signal by using the attribute information of the first target virtual speaker and the first virtual speaker signal; and the signal generation module is configured to generate a residual signal based on the first scene audio signal and the second scene audio signal; and an encoding module, configured to encode the virtual speaker signal and the residual signal to obtain a bitstream.

In an embodiment, the obtaining module is configured to: obtain a major sound field component from the first scene audio signal based on the virtual speaker set; and select the first target virtual speaker from the virtual speaker set based on the major sound field component.

In an embodiment, the obtaining module is configured to: select an HOA coefficient for the major sound field component from a higher order ambisonics HOA coefficient set based on the major sound field component, where HOA coefficients in the HOA coefficient set are in a one-to-one correspondence with virtual speakers in the virtual speaker set; and determine a virtual speaker corresponding to the HOA coefficient for the major sound field component in the virtual speaker set as the first target virtual speaker.

In an embodiment, the obtaining module is configured to: obtain a configuration parameter of the first target virtual speaker based on the major sound field component; generate an HOA coefficient for the first target virtual speaker based on the configuration parameter of the first target virtual speaker; and determine a virtual speaker corresponding to the HOA coefficient for the first target virtual speaker in the virtual speaker set as the first target virtual speaker.

In an embodiment, the obtaining module is configured to: determine configuration parameters of a plurality of virtual speakers in the virtual speaker set based on configuration information of an audio encoder; and select the configuration parameter of the first target virtual speaker from the configuration parameters of the plurality of virtual speakers based on the major sound field component.

In an embodiment, the configuration parameter of the first target virtual speaker includes location information and HOA order information of the first target virtual speaker.

The obtaining module is configured to determine the HOA coefficient for the first target virtual speaker based on the location information and the HOA order information of the first target virtual speaker.

In an embodiment, the encoding module is further configured to encode the attribute information of the first target virtual speaker and write encoded information into the bitstream.

In an embodiment, the first scene audio signal includes a higher order ambisonics HOA signal to be encoded, and the attribute information of the first target virtual speaker includes an HOA coefficient for the first target virtual speaker.

The signal generation module is configured to perform linear combination on the HOA signal to be encoded and the HOA coefficient for the first target virtual speaker to obtain the first virtual speaker signal.

In an embodiment, the first scene audio signal includes a higher order ambisonics HOA signal to be encoded, and the attribute information of the first target virtual speaker includes the location information of the first target virtual speaker.

The signal generation module is configured to: obtain the HOA coefficient for the first target virtual speaker based on the location information of the first target virtual speaker; and perform linear combination on the HOA signal to be encoded and the HOA coefficient for the first target virtual speaker to obtain the first virtual speaker signal.

In an embodiment, the obtaining module is configured to select a second target virtual speaker from the virtual speaker set based on the first scene audio signal.

The signal generation module is configured to generate a second virtual speaker signal based on the first scene audio signal and attribute information of the second target virtual speaker.

The encoding module is configured to encode the second virtual speaker signal, and write an encoded signal into the bitstream.

In an embodiment, the signal generation module is configured to obtain the second scene audio signal based on the attribute information of the first target virtual speaker, the first virtual speaker signal, the attribute information of the second target virtual speaker, and the second virtual speaker signal.

In an embodiment, the signal generation module is configured to align the first virtual speaker signal and the second virtual speaker signal, to obtain an aligned first virtual speaker signal and an aligned second virtual speaker signal.

In an embodiment, the encoding module is configured to encode the aligned second virtual speaker signal.

In an embodiment, the encoding module is configured to encode the aligned first virtual speaker signal and the residual signal.

In an embodiment, the obtaining module is configured to select a second target virtual speaker from the virtual speaker set based on the first scene audio signal.

The signal generation module is configured to generate a second virtual speaker signal based on the first scene audio signal and attribute information of the second target virtual speaker.

In an embodiment, the encoding module is configured to obtain a downmixed signal and first side information based on the first virtual speaker signal and the second virtual speaker signal. The first side information indicates a relationship between the first virtual speaker signal and the second virtual speaker signal.

In an embodiment, the encoding module is configured to encode the downmixed signal, the first side information, and the residual signal.

In an embodiment, the signal generation module is configured to align the first virtual speaker signal and the second virtual speaker signal, to obtain an aligned first virtual speaker signal and an aligned second virtual speaker signal.

The encoding module is configured to obtain the downmixed signal and the first side information based on the aligned first virtual speaker signal and the aligned second virtual speaker signal.

In an embodiment, the first side information indicates a relationship between the aligned first virtual speaker signal and the aligned second virtual speaker signal.

In an embodiment, the obtaining module is configured to: before selecting the second target virtual speaker from the virtual speaker set based on the first scene audio signal, determine, based on an encoding rate and/or signal class information of the first scene audio signal, whether a target virtual speaker other than the first target virtual speaker needs to be obtained; and select the second target virtual speaker from the virtual speaker set based on the first scene audio signal only if the target virtual speaker other than the first target virtual speaker needs to be obtained.

In an embodiment, the residual signal includes residual sub-signals on at least two sound channels.

The signal generation module is configured to determine, from the residual sub-signals on the at least two sound channels based on the configuration information of the audio encoder and/or the signal class information of the first scene audio signal, a residual sub-signal that needs to be encoded and that is on at least one sound channel.

In an embodiment, the encoding module is configured to encode the first virtual speaker signal and the residual sub-signal that needs to be encoded and that is on the at least one sound channel.

In an embodiment, the obtaining module is configured to obtain second side information if the residual sub-signals on the at least two sound channels include a residual sub-signal that does not need to be encoded and that is on at least one sound channel. The second side information indicates a relationship between the residual sub-signal that needs to be encoded and that is on the at least one sound channel and the residual sub-signal that does not need to be encoded and that is on the at least one sound channel.

In an embodiment, the encoding module is configured to write the second side information into the bitstream.

In the third aspect of this application, the composition modules of the audio encoding apparatus may further perform the operations described in the first aspect and the embodiments. For details, refer to the descriptions in the first aspect and the embodiments.

According to a fourth aspect, an embodiment of this application provides an audio decoding apparatus, including:

- a receiving module, configured to receive a bitstream;
- a decoding module, configured to decode the bitstream to obtain a virtual speaker signal and a residual signal; and
- a reconstruction module, configured to obtain a reconstructed scene audio signal based on attribute information of a target virtual speaker, the residual signal, and the virtual speaker signal.

In an embodiment, the decoding module is further configured to decode the bitstream to obtain the attribute information of the target virtual speaker.

In an embodiment, the attribute information of the target virtual speaker includes a higher order ambisonics HOA coefficient for the target virtual speaker.

The reconstruction module is configured to: perform synthesis processing on the virtual speaker signal and the HOA coefficient for the target virtual speaker to obtain a synthesized scene audio signal; and adjust the synthesized scene audio signal by using the residual signal to obtain the reconstructed scene audio signal.

In an embodiment, the attribute information of the target virtual speaker includes location information of the target virtual speaker.

The reconstruction module is configured to: determine an HOA coefficient for the target virtual speaker based on the location information of the target virtual speaker; perform synthesis processing on the virtual speaker signal and the HOA coefficient for the target virtual speaker to obtain a synthesized scene audio signal; and adjust the synthesized scene audio signal by using the residual signal to obtain the reconstructed scene audio signal.

In an embodiment, the virtual speaker signal is a downmixed signal obtained by downmixing a first virtual speaker signal and a second virtual speaker signal. The apparatus further includes a first signal compensation module.

The decoding module is configured to decode the bitstream to obtain first side information. The first side information indicates a relationship between the first virtual speaker signal and the second virtual speaker signal.

The first signal compensation module is configured to obtain the first virtual speaker signal and the second virtual speaker signal based on the first side information and the downmixed signal.

In an embodiment, the reconstruction module is configured to obtain the reconstructed scene audio signal based on the attribute information of the target virtual speaker, the residual signal, the first virtual speaker signal, and the second virtual speaker signal.

In an embodiment, the residual signal includes a residual sub-signal on a first sound channel. The apparatus further includes a second signal compensation module.

The decoding module is configured to decode the bitstream to obtain second side information. The second side information indicates a relationship between the residual sub-signal on the first sound channel and a residual sub-signal on a second sound channel.

The second signal compensation module is configured to obtain the residual sub-signal on the second sound channel based on the second side information and the residual sub-signal on the first sound channel.

In an embodiment, the reconstruction module is configured to obtain the reconstructed scene audio signal based on the attribute information of the target virtual speaker, the residual sub-signal on the first sound channel, the residual sub-signal on the second sound channel, and the virtual speaker signal.

In an embodiment, the residual signal includes a residual sub-signal on a first sound channel. The apparatus further includes a third signal compensation module.

The decoding module is configured to decode the bitstream to obtain second side information. The second side information indicates a relationship between the residual sub-signal on the first sound channel and a residual sub-signal on a third sound channel.

The third signal compensation module is configured to obtain the residual sub-signal on the third sound channel and an updated residual sub-signal on the first sound channel based on the second side information and the residual sub-signal on the first sound channel.

In an embodiment, the reconstruction module is configured to obtain the reconstructed scene audio signal based on the attribute information of the target virtual speaker, the updated residual sub-signal on the first sound channel, the residual sub-signal on the third sound channel, and the virtual speaker signal.

In the fourth aspect of this application, the composition modules of the audio decoding apparatus may further perform the operations described in the second aspect and the embodiments. For details, refer to the descriptions in the second aspect and the embodiments.

According to a fifth aspect, an embodiment of this application provides a computer-readable storage medium. The computer-readable storage medium stores instructions. When the instructions are run on a computer, the computer is enabled to perform the method according to the first aspect or the second aspect.

According to a sixth aspect, an embodiment of this application provides a computer program product including instructions. When the computer program product runs on a computer, the computer is enabled to perform the method according to the first aspect or the second aspect.

According to a seventh aspect, an embodiment of this application provides a communication apparatus. The communication apparatus may include an entity such as a terminal device or a chip. The communication apparatus includes a processor. In an embodiment, the communication apparatus further includes a memory. The memory is configured to store instructions. The processor is configured to execute the instructions in the memory, so that the communication apparatus performs the method according to any one of the first aspect or the second aspect.

According to an eighth aspect, this application provides a chip system. The chip system includes a processor, configured to support an audio encoding apparatus or an audio decoding apparatus in implementing functions in the foregoing aspects, for example, sending or processing data and/or information in the foregoing methods. In a possible design, the chip system further includes a memory, and the memory is configured to store program instructions and data that are necessary for the audio encoding apparatus or the audio decoding apparatus. The chip system may include a chip, or may include a chip and another discrete device.

According to a ninth aspect, this application provides a computer-readable storage medium, including the bitstream generated in the method according to any one of the first aspect.

DESCRIPTION OF EMBODIMENTS

Embodiments of this application provide an audio encoding and decoding method and apparatus, to reduce an amount of encoded and decoded data, and improve encoding and decoding efficiency.

The following describes embodiments of this application with reference to the accompanying drawings.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Figure 1:
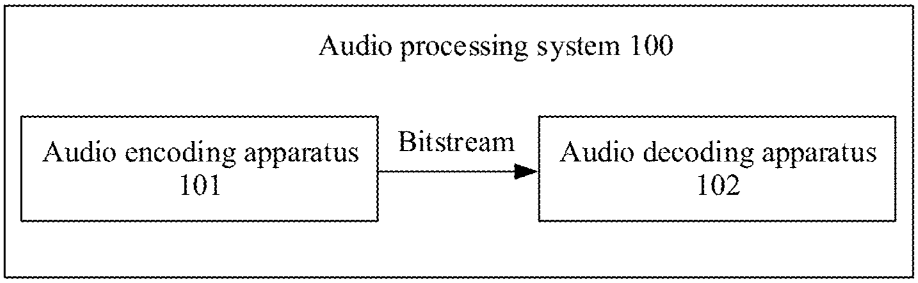
FIG. 1 is a schematic diagram of a composition structure of an audio processing system according to an embodiment of this application.

The technical solutions in embodiments of this application may be applied to various audio processing systems. FIG. 1 is a schematic diagram of a composition structure of an audio processing system according to an embodiment of this application. The audio processing system 100 may include an audio encoding apparatus 101 and an audio decoding apparatus 102. The audio encoding apparatus 101 may be configured to generate a bitstream, and then the audio-encoded bitstream may be transmitted to the audio decoding apparatus 102 through an audio transmission channel. The audio decoding apparatus 102 may receive the bitstream, and then perform an audio decoding function of the audio decoding apparatus 102, to finally obtain a reconstructed signal.

In this embodiment of this application, the audio encoding apparatus may be used in various terminal devices that need audio communication, and wireless devices and core network devices that need transcoding. For example, the audio encoding apparatus may be an audio encoder of the foregoing terminal device, wireless device, or core network device. Similarly, the audio decoding apparatus may be used in various terminal devices that need audio communication, and wireless devices and core network devices that need transcoding. For example, the audio decoding apparatus may be an audio decoder of the foregoing terminal device, wireless device, or core network device. For example, the audio encoder may include a radio access network, a media gateway of a core network, a transcoding device, a media resource server, a mobile terminal, and a fixed network terminal. The audio encoder may further be an audio codec applied to a virtual reality (VR) streaming (streaming) media service.

In this embodiment of this application, an audio encoding and decoding module (audio encoding and audio decoding) applicable to the virtual reality streaming (VR streaming) media service is used as an example. An end-to-end audio signal processing procedure includes: performing a preprocessing operation (audio preprocessing) on an audio signal A after the audio signal A passes through an acquisition module (acquisition), where the preprocessing operation includes filtering out a low frequency part of the signal, and may be extracting direction information from the signal by using 20 Hz or 50 Hz as a boundary point; and then performing encoding (audio encoding) and encapsulation (file/segment encapsulation), and then sending (delivery) an encapsulated signal to a decoder, where the decoder first performs decapsulation (file/segment decapsulation), then performs decoding (audio decoding), performs binaural rendering (audio rendering) on a decoded signal, and maps a rendered signal to a headset (headphones) of a listener, and the headset may be an independent headset or a headset on a glasses device.

Figure 2A:
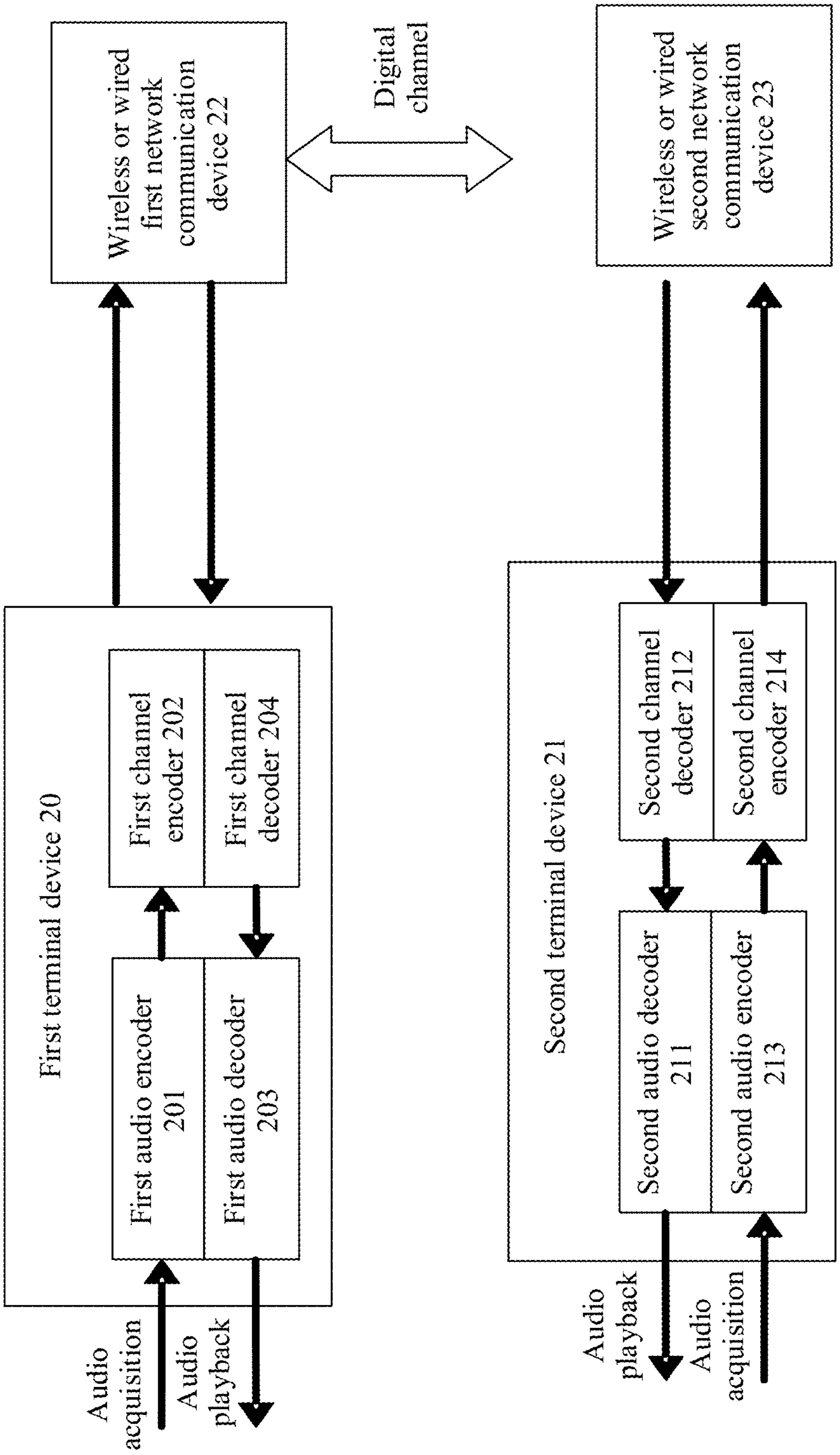
FIG. 2*a* is a schematic diagram of terminal devices in which an audio encoder and an audio decoder are used according to an embodiment of this application.

FIG. 2*a* is a schematic diagram of terminal devices in which an audio encoder and an audio decoder are used according to an embodiment of this application. Each terminal device may include an audio encoder, a channel encoder, an audio decoder, and a channel decoder. In an embodiment, the channel encoder is configured to perform channel encoding on an audio signal, and the channel decoder is configured to perform channel decoding on an audio signal. For example, a first terminal device 20 may include a first audio encoder 201, a first channel encoder 202, a first audio decoder 203, and a first channel decoder 204. A second terminal device 21 may include a second audio decoder 211, a second channel decoder 212, a second audio encoder 213, and a second channel encoder 214. The first terminal device 20 is connected to a wireless or wired first network communication device 22, the first network communication device 22 is connected to a wireless or wired second network communication device 23 through a digital channel, and the second terminal device 21 is connected to the wireless or wired second network communication device 23. The wireless or wired network communication device may be a signal transmission device in general, for example, a communication base station or a data switching device.

In audio communication, a terminal device serving as a transmitter first performs audio acquisition, performs audio encoding on an acquired audio signal, and then performs channel encoding, and transmits an encoded audio signal on a digital channel by using a wireless network or a core network. A terminal device serving as a receiver performs channel decoding based on the received signal to obtain a bitstream, and then restores the audio signal through audio decoding. The terminal device serving as the receiver performs audio playback.

Figure 2B:
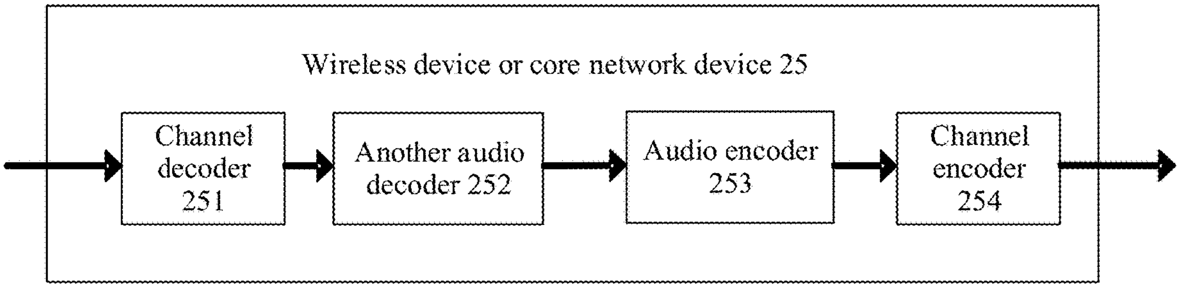
FIG. 2*b* is a schematic diagram of a wireless device or a core network device in which an audio encoder is used according to an embodiment of this application.

FIG. 2*b* is a schematic diagram of a wireless device or a core network device in which an audio encoder is used according to an embodiment of this application. The wireless device or the core network device 25 includes a channel decoder 251, another audio decoder 252, the audio encoder 253 provided in this embodiment of this application, and a channel encoder 254. The another audio decoder 252 is an audio decoder other than the audio decoder. In the wireless device or the core network device 25, the channel decoder 251 first performs channel decoding on a signal that enters the device, then the another audio decoder 252 performs audio decoding, then the audio encoder 253 provided in this embodiment of this application performs audio encoding, and finally the channel encoder 254 performs channel encoding on an audio signal. After channel encoding is completed, a channel-encoded audio signal is transmitted. The another audio decoder 252 performs audio decoding on a bitstream decoded by the channel decoder 251.

Figure 2C:
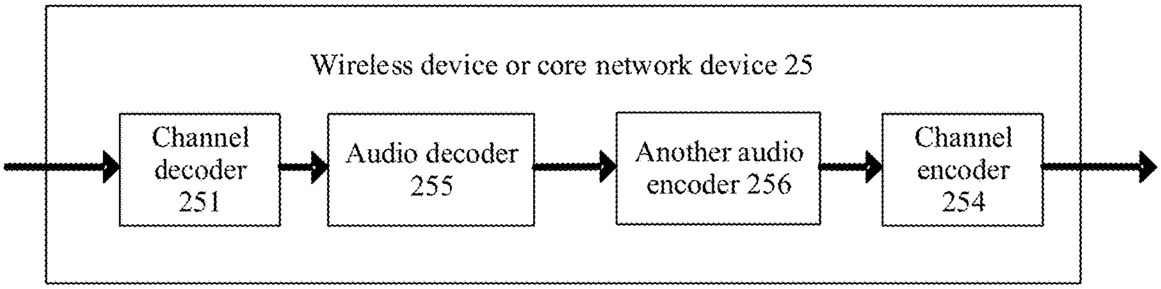
FIG. 2*c* is a schematic diagram of a wireless device or a core network device in which an audio decoder is used according to an embodiment of this application.

FIG. 2*c* is a schematic diagram of a wireless device or a core network device in which an audio decoder is used according to an embodiment of this application. The wireless device or the core network device 25 includes a channel decoder 251, the audio decoder 255 provided in this embodiment of this application, another audio encoder 256, and a channel encoder 254. The another audio encoder 256 is an audio encoder other than the audio encoder. In the wireless device or the core network device 25, the channel decoder 251 first performs channel decoding on a signal that enters the device, then the audio decoder 255 decodes a received audio-encoded bitstream, then the another audio encoder 256 performs audio encoding, and finally the channel encoder 254 performs channel encoding on an audio signal. After channel encoding is completed, a channel-encoded audio signal is transmitted. In a wireless device or a core network device, if transcoding needs to be implemented, corresponding audio encoding and decoding processing needs to be performed. The wireless device is a radio frequency-related device in communication, and the core network device is a core network-related device in communication.

In some embodiments of this application, the audio encoding apparatus may be used in various terminal devices that need audio communication, and wireless devices and core network devices that need transcoding. For example, the audio encoding apparatus may be a multi-channel encoder of the foregoing terminal device, wireless device, or core network device. Similarly, the audio decoding apparatus may be used in various terminal devices that need audio communication, and wireless devices and core network devices that need transcoding. For example, the audio decoding apparatus may be a multi-channel decoder of the foregoing terminal device, wireless device, or core network device.

Figure 3A:
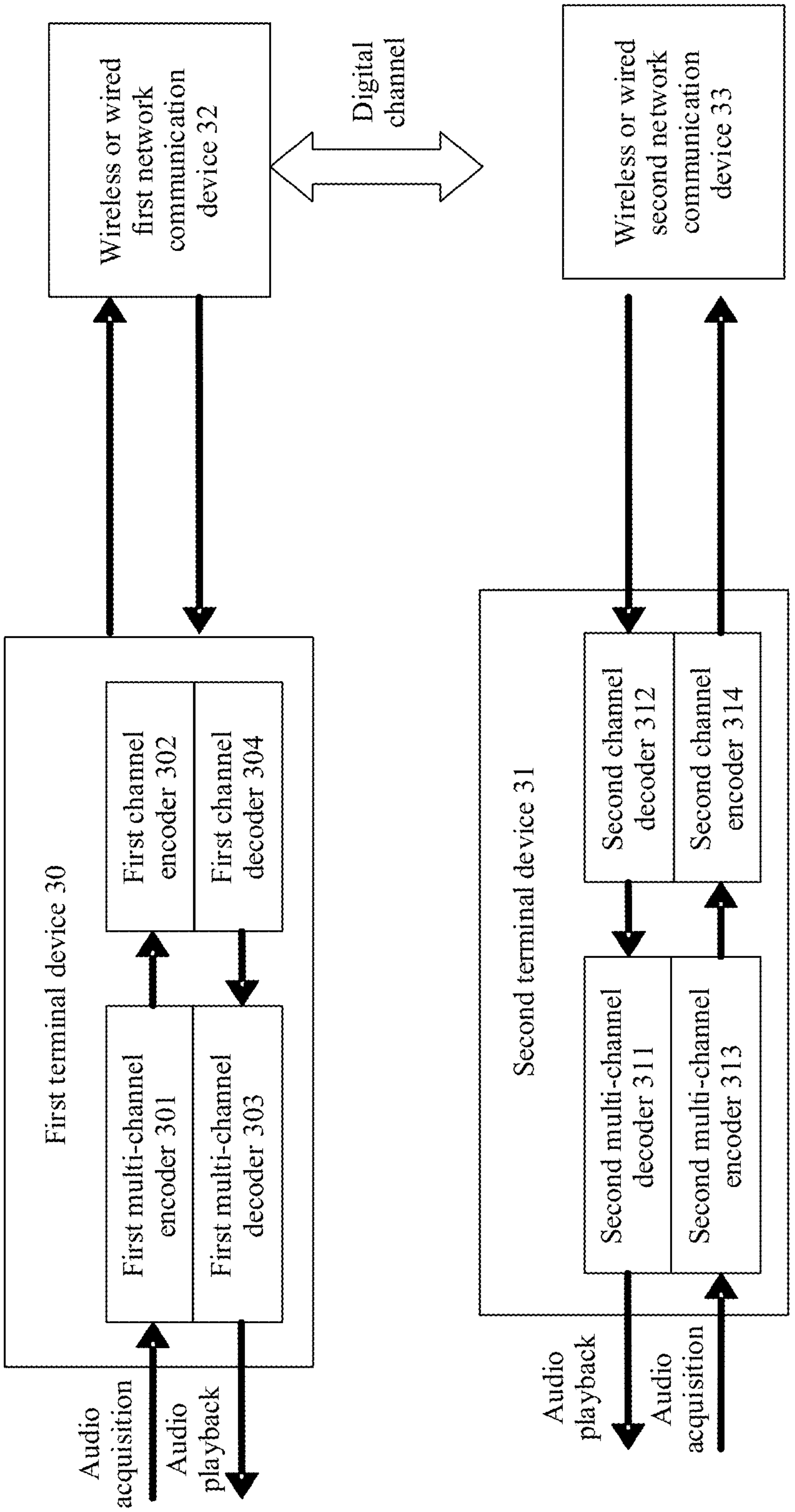
FIG. 3*a* is a schematic diagram of terminal devices in which a multi-channel encoder and a multi-channel decoder are used according to an embodiment of this application.

FIG. 3*a* is a schematic diagram of terminal devices in which a multi-channel encoder and a multi-channel decoder are used according to an embodiment of this application. Each terminal device may include a multi-channel encoder, a channel encoder, a multi-channel decoder, and a channel decoder. The multi-channel encoder may perform an audio encoding method provided in an embodiment of this application, and the multi-channel decoder may perform an audio decoding method provided in an embodiment of this application. In an embodiment, the channel encoder is used to perform channel encoding on a multi-channel signal, and the channel decoder is used to perform channel decoding on a multi-channel signal. For example, a first terminal device 30 may include a first multi-channel encoder 301, a first channel encoder 302, a first multi-channel decoder 303, and a first channel decoder 304. A second terminal device 31 may include a second multi-channel decoder 311, a second channel decoder 312, a second multi-channel encoder 313, and a second channel encoder 314. The first terminal device 30 is connected to a wireless or wired first network communication device 32, the first network communication device 32 is connected to a wireless or wired second network communication device 33 through a digital channel, and the second terminal device 31 is connected to the wireless or wired second network communication device 33. The wireless or wired network communication device may be a signal transmission device in general, for example, a communication base station or a data switching device. In audio communication, a terminal device serving as a transmitter performs multi-channel encoding on an acquired multi-channel signal, then performs channel encoding, and transmits an encoded multi-channel signal on a digital channel by using a wireless network or a core network. A terminal device serving as a receiver performs channel decoding based on the received signal to obtain a multi-channel signal encoded bitstream, and then restores the multi-channel signal through multi-channel decoding. The terminal device serving as the receiver performs playback.

Figure 3B:
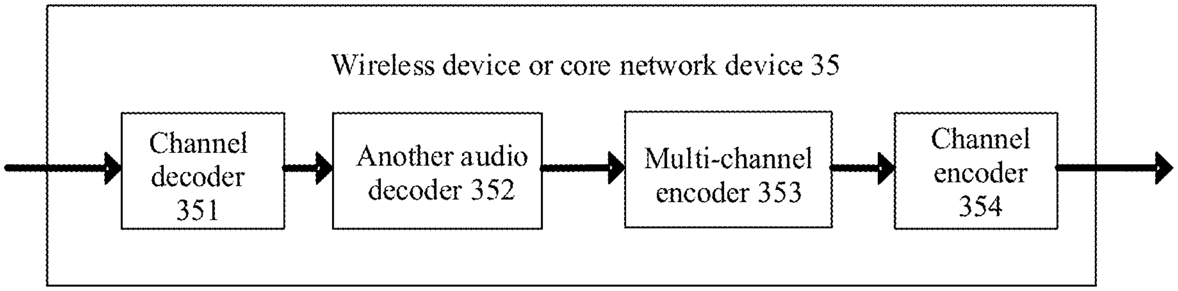
FIG. 3*b* is a schematic diagram of a wireless device or a core network device in which a multi-channel encoder is used according to an embodiment of this application.

FIG. 3*b* is a schematic diagram of a wireless device or a core network device in which a multi-channel encoder is used according to an embodiment of this application. The wireless device or core network device 35 includes: a channel decoder 351, another audio decoder 352, the multi-channel encoder 353, and a channel encoder 354. FIG. 3*b* is similar to FIG. 2*b*, and details are not described herein again.

Figure 3C:
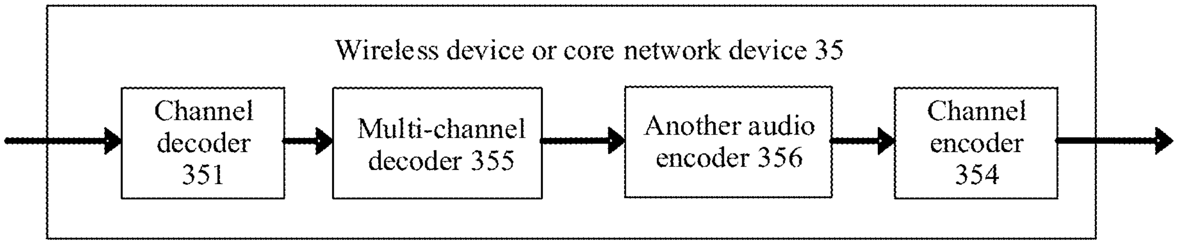
FIG. 3*c* is a schematic diagram of a wireless device or a core network device in which a multi-channel decoder is used according to an embodiment of this application.

FIG. 3*c* is a schematic diagram of a wireless device or a core network device in which a multi-channel decoder is used according to an embodiment of this application. The wireless device or core network device 35 includes: a channel decoder 351, the multi-channel decoder 355, another audio encoder 356, and a channel encoder 354. FIG. 3*c* is similar to FIG. 2*c*, and details are not described herein again.

The audio encoding processing may be a part of the multi-channel encoder, and the audio decoding processing may be a part of the multi-channel decoder. For example, performing multi-channel encoding on an acquired multi-channel signal may be: processing the acquired multi-channel signal to obtain an audio signal, and then encoding the obtained audio signal according to the method provided in embodiments of this application. The decoder decodes based on the multi-channel signal encoded bitstream to obtain the audio signal, and restores the multi-channel signal after upmixing. Therefore, embodiments of this application may also be applied to a multi-channel encoder and a multi-channel decoder in a terminal device, a wireless device, or a core network device. In a wireless device or a core network device, if transcoding needs to be implemented, corresponding multi-channel encoding and decoding processing needs to be performed.

Figure 4:
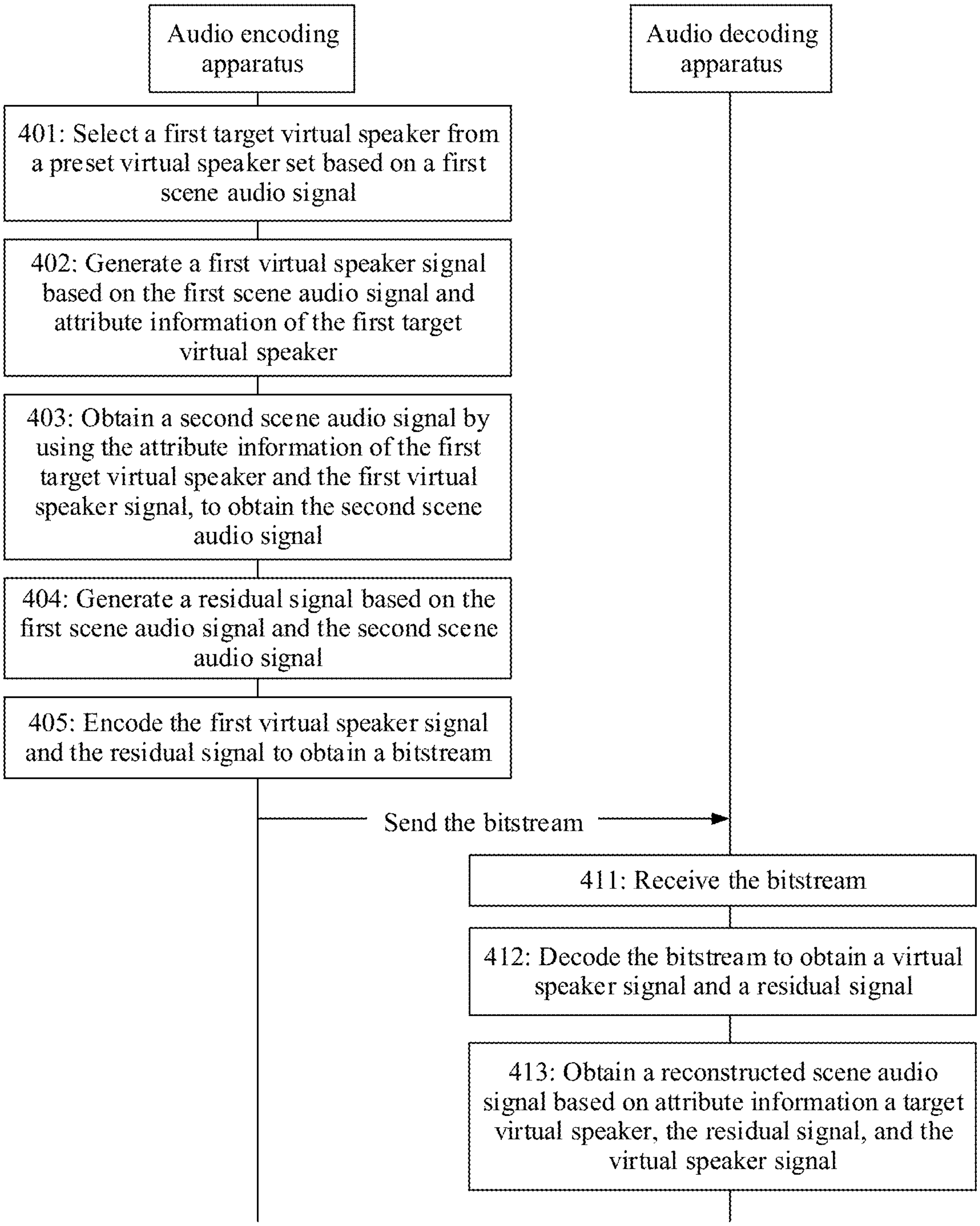
FIG. 4 is a schematic flowchart of interaction between an audio encoding apparatus and an audio decoding apparatus according to an embodiment of this application.

The audio encoding and decoding method provided in embodiments of this application may include an audio encoding method and an audio decoding method. The audio encoding method is performed by an audio encoding apparatus, and the audio decoding method is performed by an audio decoding apparatus. The audio encoding apparatus and the audio decoding apparatus may communicate with each other. The following describes, based on the foregoing system architecture, the audio encoding apparatus, and the audio decoding apparatus, the audio encoding method and the audio decoding method that are provided in embodiments of this application. FIG. 4 is a schematic flowchart of interaction between an audio encoding apparatus and an audio decoding apparatus according to an embodiment of this application. The following operations 401 to 403 may be performed by the audio encoding apparatus (referred to as an encoder), and the following operations 411 to 413 may be performed by the audio decoding apparatus (referred to as a decoder). The following process is mainly included.

401: Select a first target virtual speaker from a preset virtual speaker set based on a first scene audio signal.

The encoder obtains the first scene audio signal. The first scene audio signal is an audio signal acquired from a sound field at a location of a microphone in space, and the first scene audio signal may also be referred to as an audio signal in an original scene. For example, the first scene audio signal may be an audio signal obtained by using a higher order ambisonics (HOA) technology.

In this embodiment of this application, the virtual speaker set can be preconfigured for the encoder. The virtual speaker set may include a plurality of virtual speakers. During actual playback, a scene audio signal may be played back by using a headset, or may be played back by using a plurality of speakers arranged in a room. When the speakers are used for playback, a basic method is to superimpose signals of the plurality of speakers, so that a sound field at a point (a location of a listener) in space is as close as possible to an original sound field under a standard when the scene audio signal is recorded. In this embodiment of this application, the virtual speaker is used to calculate a playback signal corresponding to the scene audio signal, the playback signal is used as a transmission signal, and a compressed signal is generated. The virtual speaker represents a speaker that exists in a sound field in space in a virtual manner, and the virtual speaker can implement playback of a scene audio signal at the encoder.

In this embodiment of this application, the virtual speaker set includes the plurality of virtual speakers, and each of the plurality of virtual speakers corresponds to a virtual speaker configuration parameter (configuration parameter for short). The virtual speaker configuration parameter includes but is not limited to information such as a quantity of virtual speakers, an HOA order of the virtual speaker, and location coordinates of the virtual speaker. After obtaining the virtual speaker set, the encoder selects the first target virtual speaker from the preset virtual speaker set based on the first scene audio signal. The first scene audio signal is a to-be-encoded audio signal in an original scene, and the first target virtual speaker may be a virtual speaker in the virtual speaker set. For example, the first target virtual speaker can be selected from the preset virtual speaker set according to a preconfigured target virtual speaker selection policy. The target virtual speaker selection policy is a policy of selecting a target virtual speaker matching the first scene audio signal from the virtual speaker set, for example, selecting the first target virtual speaker based on a sound field component obtained by each virtual speaker from the first scene audio signal. For another example, the first target virtual speaker is selected from the first virtual speaker set based on location information of each virtual speaker. The first target virtual speaker is a virtual speaker that is in the virtual speaker set and that is used to play back the first scene audio signal, that is, the encoder can select, from the virtual speaker set, a target virtual encoder that can play back the first scene audio signal.

In this embodiment of this application, after the first target virtual speaker is selected in 401, a subsequent processing process for the first target virtual speaker, for example, subsequent operations 402 to 405 may be performed. This is not limited. In this embodiment of this application, not only the first target virtual speaker can be selected, but also more target virtual speakers can be selected. For example, a second target virtual speaker may be selected. For the second target virtual speaker, a process similar to the subsequent operations 402 to 405 also needs to be performed. For details, refer to descriptions in subsequent embodiments.

In this embodiment of this application, after the encoder selects the first target virtual speaker, the encoder can further obtain attribute information of the first target virtual speaker. The attribute information of the first target virtual speaker includes information related to an attribute of the first target virtual speaker. The attribute information may be set depending on a specific application scenario. For example, the attribute information of the first target virtual speaker includes location information of the first target virtual speaker or an HOA coefficient for the first target virtual speaker. The location information of the first target virtual speaker may be information about a distribution location of the first target virtual speaker in space, or may be information about a location of the first target virtual speaker in the virtual speaker set relative to another virtual speaker. This is not limited herein. Each virtual speaker in the virtual speaker set corresponds to an HOA coefficient, and the HOA coefficient may also be referred to as an ambisonic coefficient. The following describes the HOA coefficient for the virtual speaker.

For example, an HOA order may be one of orders 2 to 10. When an audio signal is recorded, a signal sampling rate is 48 to 192 kilohertz (kHz), and a sampling depth is 16 or 24 bits (bits). An HOA signal may be generated based on the HOA coefficient for the virtual speaker and a scene audio signal. The HOA signal is characterized by information about space with a sound field, and the HOA signal is information describing certain precision of a sound field signal at a point in space. Therefore, it can be considered that another representation form is used to describe a sound field signal of a location point. In this description method, a signal of a location point in space can be described with same precision by using a smaller amount of data, to achieve an objective of signal compression. A sound field in space can be decomposed into superposition of a plurality of plane waves. Therefore, theoretically, a sound field expressed by an HOA signal can be expressed by using superposition of a plurality of plane waves, and each plane wave is represented by using an audio signal on one sound channel and a direction vector. A representation form of superimposed plane waves can accurately express an original sound field by using fewer sound channels, to achieve the objective of signal compression.

In some embodiments of this application, in addition to performing 401 by the encoder, the audio encoding method provided in this embodiment of this application further includes the following operation:

A1: obtaining a major sound field component from the first scene audio signal based on the virtual speaker set.

The major sound field component in A1 may also be referred to as a first major sound field component.

When A1 is performed, the selecting a first target virtual speaker from a preset virtual speaker set based on a first scene audio signal in 401 includes:

B1: selecting the first target virtual speaker from the virtual speaker set based on the major sound field component.

The encoder obtains the virtual speaker set, and the encoder performs signal decomposition on the first scene audio signal by using the virtual speaker set, to obtain a major sound field component corresponding to the first scene audio signal. The major sound field component represents an audio signal corresponding to a major sound field in the first scene audio signal. For example, the virtual speaker set includes a plurality of virtual speakers, and a plurality of sound field components may be obtained from the first scene audio signal based on the plurality of virtual speakers, that is, each virtual speaker may obtain one sound field component from the first scene audio signal, and then a major sound field component is selected from the plurality of sound field components. For example, the major sound field component may be one or more sound field components with a maximum value among the plurality of sound field components, the major sound field component may alternatively be one or more sound field components with a dominant direction among the plurality of sound field components. Each virtual speaker in the virtual speaker set corresponds to a sound field component, and the first target virtual speaker is selected from the virtual speaker set based on the major sound field component. For example, a virtual speaker corresponding to the major sound field component is the first target virtual speaker selected by the encoder. In this embodiment of this application, the encoder can select the first target virtual speaker based on the major sound field component, to resolve a problem that the encoder needs to determine the first target virtual speaker.

In this embodiment of this application, the encoder can select the first target virtual speaker in a plurality of manners. For example, the encoder may preset a virtual speaker at a specified location as the first target virtual speaker, that is, select, based on a location of each virtual speaker in the virtual speaker set, a virtual speaker that meets the specified location as the first target virtual speaker. This is not limited.

In some embodiments of this application, the selecting the first target virtual speaker from the virtual speaker set based on the major sound field component in B1 includes:

selecting an HOA coefficient for the major sound field component from a higher order ambisonics HOA coefficient set based on the major sound field component, where HOA coefficients in the HOA coefficient set are in a one-to-one correspondence with virtual speakers in the virtual speaker set; and determining a virtual speaker corresponding to the HOA coefficient for the major sound field component in the virtual speaker set as the first target virtual speaker.

The encoder pre-configures the HOA coefficient set based on the virtual speaker set, and there is the one-to-one correspondence between the HOA coefficients in the HOA coefficient set and the virtual speakers in the virtual speaker set. Therefore, after the HOA coefficient is selected based on the major sound field component, the virtual speaker set is searched for, based on the one-to-one correspondence, a target virtual speaker corresponding to the HOA coefficient for the major sound field component, and the found target virtual speaker is the first target virtual speaker. This resolves a problem that the encoder needs to determine the first target virtual speaker. For example, the HOA coefficient set includes an HOA coefficient 1, an HOA coefficient 2, and an HOA coefficient 3, and the virtual speaker set includes a virtual speaker 1, a virtual speaker 2, and a virtual speaker 3. The HOA coefficients in the HOA coefficient set are in a one-to-one correspondence with the virtual speakers in the virtual speaker set. For example, the HOA coefficient 1 corresponds to the virtual speaker 1, the HOA coefficient 2 corresponds to the virtual speaker 2, and the HOA coefficient 3 corresponds to the virtual speaker 3. If the HOA coefficient 3 is selected from the HOA coefficient set based on the major sound field component, it can be determined that the first target virtual speaker is the virtual speaker 3.

In some embodiments of this application, the selecting the first target virtual speaker from the virtual speaker set based on the major sound field component in B1 further includes:

C1: obtaining a configuration parameter of the first target virtual speaker based on the major sound field component;

C2: generating an HOA coefficient for the first target virtual speaker based on the configuration parameter of the first target virtual speaker; and C3: determining a virtual speaker corresponding to the HOA coefficient for the first target virtual speaker in the virtual speaker set as the first target virtual speaker.

After obtaining the major sound field component, the encoder can determine the configuration parameter of the first target virtual speaker based on the major sound field component. For example, the major sound field component is one or more sound field components with a largest value in a plurality of sound field components, or the major sound field component may be one or more sound field components with a dominant direction in a plurality of sound field components. The major sound field component can be used to determine the first target virtual speaker matching the first scene audio signal, corresponding attribute information is configured for the first target virtual speaker, and an HOA coefficient for the first target virtual speaker can be generated based on the configuration parameter of the first target virtual speaker. A process of generating the HOA coefficient can be implemented by using an HOA algorithm, and details are not described herein again. Each virtual speaker in the virtual speaker set corresponds to an HOA coefficient. Therefore, the first target virtual speaker can be selected from the virtual speaker set based on the HOA coefficient for each virtual speaker, to resolve a problem that the encoder needs to determine the first target virtual speaker.

In some embodiments of this application, the obtaining a configuration parameter of the first target virtual speaker based on the major sound field component in C1 includes:

determining configuration parameters of a plurality of virtual speakers in the virtual speaker set based on configuration information of an audio encoder; and selecting the configuration parameter of the first target virtual speaker from the configuration parameters of the plurality of virtual speakers based on the major sound field component.

The audio encoder may pre-store the configuration parameters of the plurality of virtual speakers, and a configuration parameter of each virtual speaker may be determined by using configuration information of the audio encoder. The audio encoder refers to the foregoing encoder, and the configuration information of the audio encoder includes but is not limited to an HOA order and an encoding bit rate. The configuration information of the audio encoder may be used to determine a quantity of virtual speakers and a location parameter of each virtual speaker, to resolve a problem that the encoder needs to determine the configuration parameter of the virtual speaker. For example, if the encoding bit rate is low, a small quantity of virtual speakers may be configured; or, if the encoding bit rate is high, a large plurality of virtual speakers may be configured. For another example, an HOA order of the virtual speaker may be equal to the HOA order of the audio encoder. In this embodiment of this application, in addition to determining the configuration parameters of the plurality of virtual speakers by using the configuration information of the audio encoder, the configuration parameters of the plurality of virtual speakers can be further determined based on user-defined information. For example, a user can define a location of a virtual speaker, an HOA order, and a quantity of virtual speakers. This is not limited.

The encoder obtains the configuration parameters of the plurality of virtual speakers from the virtual speaker set. For each virtual speaker, a corresponding virtual speaker configuration parameter exists, and each virtual speaker configuration parameter includes but is not limited to information such as an HOA order of the virtual speaker and location coordinates of the virtual speaker. A configuration parameter of each virtual speaker can be used to generate an HOA coefficient for the virtual speaker. A process of generating the HOA coefficient can be implemented by using an HOA algorithm, and details are not described herein again. An HOA coefficient is generated for each virtual speaker in the virtual speaker set, and the HOA coefficients respectively configured for all the virtual speakers in the virtual speaker set form the HOA coefficient set, to resolve a problem that the encoder needs to determine the HOA coefficient for each virtual speaker in the virtual speaker set.

In some embodiments of this application, the configuration parameter of the first target virtual speaker includes location information and HOA order information of the first target virtual speaker.

The generating an HOA coefficient for the first target virtual speaker based on the configuration parameter of the first target virtual speaker in C2 includes:

determining the HOA coefficient for the first target virtual speaker based on the location information and the HOA order information of the first target virtual speaker.

The configuration parameter of each virtual speaker in the virtual speaker set may include location information of the virtual speaker and HOA order information of the virtual speaker. Similarly, the configuration parameter of the first target virtual speaker includes the location information and the HOA order information of the first target virtual speaker. For example, location information of each virtual speaker in the virtual speaker set can be determined according to a local equidistant virtual speaker space distribution manner. The local equidistant virtual speaker space distribution manner means that a plurality of virtual speakers are distributed in space in a local equidistant manner. For example, the local equidistant manner may include even distribution or uneven distribution. Both the location information and HOA order information of each virtual speaker can be used to generate an HOA coefficient for the virtual speaker. A process of generating the HOA coefficient can be implemented by using an HOA algorithm. This resolves a problem that the encoder needs to determine the HOA coefficient for the first target virtual speaker.

In addition, in this embodiment of this application, a group of HOA coefficients is generated for each virtual speaker in the virtual speaker set, and a plurality of groups of HOA coefficients form the foregoing HOA coefficient set. The HOA coefficients respectively configured for all the virtual speakers in the virtual speaker set form the HOA coefficient set, to resolve a problem that the encoder needs to determine the HOA coefficient for each virtual speaker in the virtual speaker set.

402: Generate a first virtual speaker signal based on the first scene audio signal and the attribute information of the first target virtual speaker.

After the encoder obtains the first scene audio signal and the attribute information of the first target virtual speaker, the encoder may play back the first scene audio signal, and the encoder generates the first virtual speaker signal based on the first scene audio signal and the attribute information of the first target virtual speaker. The first virtual speaker signal is a playback signal of the first scene audio signal. The attribute information of the first target virtual speaker describes the information related to the attribute of the first target virtual speaker. The first target virtual speaker is a virtual speaker that is selected by the encoder and that can play back the first scene audio signal. Therefore, the first scene audio signal is played back by using the attribute information of the first target virtual speaker, to obtain the first virtual speaker signal. A data amount of the first virtual speaker signal is unrelated to a quantity of sound channels of the first scene audio signal, and the data amount of the first virtual speaker signal is related to the first target virtual speaker. For example, in this embodiment of this application, compared with the first scene audio signal, the first virtual speaker signal is represented by using fewer sound channels. For example, the first scene audio signal is a 3-order HOA signal, and the HOA signal has 16 sound channels. In this embodiment of this application, the 16 sound channels can be compressed into four sound channels.

The four sound channels include two sound channels occupied by a virtual speaker signal generated by the encoder and two sound channels occupied by the residual signal. For example, the virtual speaker signal generated by the encoder may include the first virtual speaker signal and a second virtual speaker signal, and a quantity of sound channels of the virtual speaker signal generated by the encoder is unrelated to the quantity of the sound channels of the first scene audio signal. It can be known from the description in subsequent operations that, a bitstream may carry virtual speaker signals on two sound channels and residual signals on two sound channels. In an embodiment, the decoder receives the bitstream, and decodes the bitstream to obtain the virtual speaker signals on two sound channels and the residual signals on two sound channels. The decoder can reconstruct scene audio signals on 16 sound channels by using the virtual speaker signals on the two sound channels and the residual signals on the two sound channels. This ensures that a reconstructed scene audio signal has equivalent subjective and objective quality when compared with an audio signal in an original scene.

It may be understood that the foregoing operations 401 and 402 may be implemented by using a spatial encoder, for example, a moving picture expert group (MPEG) spatial encoder.

In some embodiments of this application, the first scene audio signal may include an HOA signal to be encoded, and the attribute information of the first target virtual speaker includes the HOA coefficient for the first target virtual speaker.

The generating a first virtual speaker signal based on the first scene audio signal and the attribute information of the first target virtual speaker in 402 includes:

performing linear combination on the HOA signal to be encoded and the HOA coefficient for the first target virtual speaker to obtain the first virtual speaker signal.

An example in which the first scene audio signal is the HOA signal to be encoded is used. The encoder first determines the HOA coefficient for the first target virtual speaker. For example, the encoder selects an HOA coefficient from the HOA coefficient set based on the major sound field component, and the selected HOA coefficient is the HOA coefficient for the first target virtual speaker. After the encoder obtains the HOA signal to be encoded and the HOA coefficient for the first target virtual speaker, the first virtual speaker signal can be generated based on the HOA signal to be encoded and the HOA coefficient for the first target virtual speaker. The HOA signal to be encoded can be obtained by performing linear combination by using the HOA coefficient for the first target virtual speaker, and solving of the first virtual speaker signal can be converted into solving of linear combination.

For example, the attribute information of the first target virtual speaker may include the HOA coefficient for the first target virtual speaker. The encoder can obtain the HOA coefficient for the first target virtual speaker by decoding the attribute information of the first target virtual speaker. The encoder performs linear combination on the HOA signal to be encoded and the HOA coefficient for the first target virtual speaker. In other words, the encoder combines the HOA signal to be encoded and the HOA coefficient for the first target virtual speaker together to obtain a linear combination matrix. Then, the encoder can obtain an optimal solution of the linear combination matrix, and the obtained optimal solution is the first virtual speaker signal. The optimal solution is related to an algorithm used to solve the linear combination matrix. This embodiment of this application resolves a problem that the encoder needs to generate the first virtual speaker signal.

In some embodiments of this application, the first scene audio signal includes a higher order ambisonics HOA signal to be encoded, and the attribute information of the first target virtual speaker includes the location information of the first target virtual speaker.

The generating a first virtual speaker signal based on the first scene audio signal and the attribute information of the first target virtual speaker in 402 includes:

obtaining the HOA coefficient for the first target virtual speaker based on the location information of the first target virtual speaker; and performing linear combination on the HOA signal to be encoded and the HOA coefficient for the first target virtual speaker to obtain the first virtual speaker signal.

The attribute information of the first target virtual speaker may include the location information of the first target virtual speaker. The encoder pre-stores the HOA coefficient for each virtual speaker in the virtual speaker set. The encoder further stores the location information of each virtual speaker. There is a correspondence between the location information of the virtual speaker and the HOA coefficient for the virtual speaker. Therefore, the encoder can determine the HOA coefficient for the first target virtual speaker based on the location information of the first target virtual speaker. If the attribute information includes the HOA coefficient, the encoder can obtain the HOA coefficient for the first target virtual speaker by decoding the attribute information of the first target virtual speaker.

After the encoder obtains the HOA signal to be encoded and the HOA coefficient for the first target virtual speaker, the encoder performs linear combination on the HOA signal to be encoded and the HOA coefficient for the first target virtual speaker. In other words, the encoder combines the HOA signal to be encoded and the HOA coefficient for the first target virtual speaker together to obtain a linear combination matrix. Then, the encoder can obtain an optimal solution of the linear combination matrix, and the obtained optimal solution is the first virtual speaker signal.

For example, the HOA coefficient for the first target virtual speaker is represented by a matrix A, and the HOA signal to be encoded can be obtained through linear combination by using the matrix A. A theoretical optimal solution w, namely, the first virtual speaker signal can be obtained by using a least square method. For example, the following calculation formula may be used:

$$w=A^{-1}X, \text{ where}$$

$A^{-1}$ represents an inverse matrix of the matrix A, a size of the matrix A is (M×C), C is a quantity of first target virtual speakers, M is a quantity of sound channels of an N-order HOA coefficient, and a represents the HOA coefficient for the first target virtual speaker. For example, $$A=\begin{bmatrix} a_{11} & \cdots & a_{1C} \\ \vdots & \ddots & \vdots \\ a_{M1} & \cdots & a_{MC} \end{bmatrix}.$$

X represents the HOA signal to be encoded, a size of the matrix X is (M×L), M is a quantity of sound channels of an N-order HOA coefficient, L is a quantity of sampling points, and x represents a coefficient for the HOA signal to be encoded. For example, $$X = \begin{bmatrix} x_{11} & \cdots & x_{1L} \\ \vdots & & \vdots \\ x_{M1} & \cdots & x_{ML} \end{bmatrix}.$$

In this embodiment of this application, in order that the decoder can accurately obtain the first virtual speaker signal from the encoder, the encoder may further perform the following operations 403 and 404 to generate a residual signal.

403: Obtain a second scene audio signal by using the attribute information of the first target virtual speaker and the first virtual speaker signal.

The encoder can obtain the attribute information of the first target virtual speaker, and the first target virtual speaker may be a virtual speaker that is in the virtual speaker set and that is used to play back the first virtual speaker signal at the decoder. The attribute information of the first target virtual speaker may include the location information of the first target virtual speaker and the HOA coefficient for the first target virtual speaker. After the encoder obtains the first virtual speaker signal, the encoder performs signal reconstruction based on the attribute information of the first target virtual speaker, and can obtain the second scene audio signal through signal reconstruction.

In some embodiments of this application, the obtaining a second scene audio signal by using the attribute information of the first target virtual speaker and the first virtual speaker signal in 403 includes:

determining the HOA coefficient for the first target virtual speaker; and performing synthesis processing on the first virtual speaker signal and the HOA coefficient for the first target virtual speaker.

The encoder first determines the HOA coefficient for the first target virtual speaker. For example, the encoder may pre-store the HOA coefficient for the first target virtual speaker. After obtaining the first virtual speaker signal and the HOA coefficient for the first target virtual speaker, the encoder can generate a reconstructed scene audio signal based on the first virtual speaker signal and the HOA coefficient for the first target virtual speaker.

For example, the HOA coefficient for the first target virtual speaker is represented by a matrix A, a size of the matrix A is (M×C), C is a quantity of first target virtual speakers, and M is a quantity of sound channels of an N-order HOA coefficient. The first virtual speaker signal is represented by a matrix W, and a size of the matrix W is (C×L), where L represents a quantity of signal sampling points. A reconstructed HOA signal is obtained by using the following formula:

$$T=AW.$$

T obtained by using the foregoing calculation formula is the second scene audio signal.

404: Generate the residual signal based on the first scene audio signal and the second scene audio signal.

In this embodiment of this application, the encoder obtains the second scene audio signal through signal reconstruction (which may also be referred to as local decoding). The first scene audio signal is an audio signal in an original scene. Therefore, a residual can be calculated for the first scene audio signal and the second scene audio signal, to generate the residual signal. The residual signal can represent a difference between the second scene audio signal generated by using the first target virtual speaker and the audio signal in the original scene (namely, the first scene audio signal).

In some embodiments of this application, the generating the residual signal based on the first scene audio signal and the second scene audio signal includes:

performing difference calculation on the first scene audio signal and the second scene audio signal to obtain the residual signal.

Both the first scene audio signal and the second scene audio signal can be represented in a matrix form, and the residual signal can be obtained by performing difference calculation on matrices respectively corresponding to the two scene audio signals.

405: Encode the first virtual speaker signal and the residual signal to obtain a bitstream.

In this embodiment of this application, after the encoder generates the first virtual speaker signal and the residual signal, the encoder can encode the first virtual speaker signal and the residual signal to obtain the bitstream. For example, the encoder may be a core encoder, and the core encoder encodes the first virtual speaker signal to obtain the bitstream. The bitstream may also be referred to as an audio-signal-encoded bitstream. In this embodiment of this application, the encoder encodes the first virtual speaker signal and the residual signal, but does not encode the scene audio signal. The first target virtual speaker is selected, so that a sound field at a location of a listener in space is as close as possible to an original sound field when the scene audio signal is recorded, to ensure encoding quality of the encoder. In addition, an amount of encoded data of the first virtual speaker signal is unrelated to a quantity of sound channels of the scene audio signal, thereby reducing an amount of data of an encoded scene audio signal and improving encoding and decoding efficiency.

In some embodiments of this application, after the encoder performs the foregoing operations 401 to 405, the audio encoding method provided in this embodiment of this application further includes the following operation:

encoding the attribute information of the first target virtual speaker, and writing encoded information into the bitstream.

In addition to encoding a virtual speaker, the encoder can also encode the attribute information of the first target virtual speaker, and write encoded attribute information of the first target virtual speaker into the bitstream. In this case, an obtained bitstream may include an encoded virtual speaker and the encoded attribute information of the first target virtual speaker. In this embodiment of this application, the bitstream can carry the encoded attribute information of the first target virtual speaker, so that the decoder can determine the attribute information of the first target virtual speaker by decoding the bitstream, to facilitate audio decoding by the decoder.

It should be noted that the foregoing operations 401 to 405 describe a process of generating the first virtual speaker signal based on the first target virtual speaker when the first target virtual speaker is selected from the virtual speaker set, and performing signal reconstruction, residual signal generation, and signal encoding based on the first virtual speaker signal. In this embodiment of this application, the encoder can not only select the first target virtual speaker, but also select more target virtual speakers. For example, the encoder may further select the second target virtual speaker.

This is not limited. For the second target virtual speaker, a process similar to the foregoing operations 402 to 405 also needs to be performed. Details are described below.

In some embodiments of this application, in addition to performing the foregoing operations by the encoder, the audio encoding method provided in this embodiment of this application further includes:

D1: selecting the second target virtual speaker from the virtual speaker set based on the first scene audio signal;

D2: generating the second virtual speaker signal based on the first scene audio signal and attribute information of the second target virtual speaker; and D3: encoding the second virtual speaker signal, and writing an encoded signal into the bitstream.

An embodiment of D1 is similar to that of 401. The second target virtual speaker is another target virtual speaker that is selected by the encoder and that is different from the first target virtual encoder. The first scene audio signal is a to-be-encoded audio signal in an original scene, and the second target virtual speaker may be a virtual speaker in the virtual speaker set. For example, the second target virtual speaker can be selected from the preset virtual speaker set according to a preconfigured target virtual speaker selection policy. The target virtual speaker selection policy is a policy of selecting a target virtual speaker matching the first scene audio signal from the virtual speaker set, for example, selecting the second target virtual speaker based on a sound field component obtained by each virtual speaker from the first scene audio signal.

In some embodiments of this application, the audio encoding method provided in this embodiment of this application further includes the following operation:

E1: obtaining a second major sound field component from the first scene audio signal based on the virtual speaker set.

When E1 is performed, the selecting the second target virtual speaker from the preset virtual speaker set based on the first scene audio signal in D1 includes:

F1: selecting the second target virtual speaker from the virtual speaker set based on the second major sound field component.

The encoder obtains the virtual speaker set, and the encoder performs signal decomposition on the first scene audio signal by using the virtual speaker set, to obtain the second major sound field component corresponding to the first scene audio signal. The second major sound field component represents an audio signal corresponding to a major sound field in the first scene audio signal. For example, the virtual speaker set includes a plurality of virtual speakers, and a plurality of sound field components may be obtained from the first scene audio signal based on the plurality of virtual speakers, that is, each virtual speaker may obtain one sound field component from the first scene audio signal, and then a second major sound field component is selected from the plurality of sound field components. For example, the second major sound field component may be one or more sound field components with a maximum value among the plurality of sound field components, alternatively, the second major sound field component may be one or more sound field components with a dominant direction among the plurality of sound field components. The second target virtual speaker is selected from the virtual speaker set based on the second major sound field component. For example, a virtual speaker corresponding to the second major sound field component is the second target virtual speaker selected by the encoder. In this embodiment of this application, the encoder can select the second target virtual speaker by using the major sound field component, to resolve a problem that the encoder needs to determine the second target virtual speaker.

In some embodiments of this application, the selecting the second target virtual speaker from the virtual speaker set based on the second major sound field component in F1 includes:

selecting an HOA coefficient for the second major sound field component from the HOA coefficient set based on the second major sound field component, where HOA coefficients in the HOA coefficient set are in a one-to-one correspondence with virtual speakers in the virtual speaker set; and determining a virtual speaker corresponding to the HOA coefficient for the second major sound field component in the virtual speaker set as the second target virtual speaker.

The foregoing implementation is similar to the process of determining the first target virtual speaker in the foregoing embodiment, and details are not described herein again.

In some embodiments of this application, the selecting the second target virtual speaker from the virtual speaker set based on the second major sound field component in F1 further includes:

G1: obtaining a configuration parameter of the second target virtual speaker based on the second major sound field component;

G2: generating an HOA coefficient for the second target virtual speaker based on the configuration parameter of the second target virtual speaker; and G3: determining a virtual speaker corresponding to the HOA coefficient for the second target virtual speaker in the virtual speaker set as the second target virtual speaker.

The foregoing embodiment is similar to the process of determining the first target virtual speaker in the foregoing embodiment, and details are not described herein again.

In some embodiments of this application, the obtaining a configuration parameter of the second target virtual speaker based on the second major sound field component in G1 includes:

determining configuration parameters of a plurality of virtual speakers in the virtual speaker set based on configuration information of an audio encoder; and selecting the configuration parameter of the second target virtual speaker from the configuration parameters of the plurality of virtual speakers based on the second major sound field component.

The foregoing embodiment is similar to the process of determining the configuration parameter of the first target virtual speaker in the foregoing embodiment, and details are not described herein again.

In some embodiments of this application, the configuration parameter of the second target virtual speaker includes location information and HOA order information of the second target virtual speaker.

The generating an HOA coefficient for the second target virtual speaker based on the configuration parameter of the second target virtual speaker in G2 includes:

determining the HOA coefficient for the second target virtual speaker based on the location information and the HOA order information of the second target virtual speaker.

The foregoing embodiment is similar to the process of determining the HOA coefficient for the first target virtual speaker in the foregoing embodiment, and details are not described herein again.

In some embodiments of this application, the first scene audio signal includes an HOA signal to be encoded, and the attribute information of the second target virtual speaker includes an HOA coefficient for the second target virtual speaker.

The generating the second virtual speaker signal based on the first scene audio signal and attribute information of the second target virtual speaker in D2 includes:

performing linear combination on the HOA signal to be encoded and the HOA coefficient for the second target virtual speaker to obtain the second virtual speaker signal.

In some embodiments of this application, the first scene audio signal includes a higher order ambisonics HOA signal to be encoded, and the attribute information of the second target virtual speaker includes location information of the second target virtual speaker.

The generating the second virtual speaker signal based on the first scene audio signal and attribute information of the second target virtual speaker in D2 includes:

obtaining the HOA coefficient for the second target virtual speaker based on the location information of the second target virtual speaker; and performing linear combination on the HOA signal to be encoded and the HOA coefficient for the second target virtual speaker to obtain the second virtual speaker signal.

The foregoing embodiment is similar to the process of determining the first virtual speaker signal in the foregoing embodiment, and details are not described herein again.

In this embodiment of this application, after the encoder generates the second virtual speaker signal, the encoder may further perform D3 to encode the second virtual speaker signal, and write the encoded signal into the bitstream. An encoding method used by the encoder is similar to 405, so that the bitstream can carry an encoded result of the second virtual speaker signal.

In an embodiment, in an implementation scene in which the foregoing operations D1 to D3 are performed, the obtaining a second scene audio signal by using the attribute information of the first target virtual speaker and the first virtual speaker signal in 403 includes:

H1: obtaining the second scene audio signal based on the attribute information of the first target virtual speaker, the first virtual speaker signal, the attribute information of the second target virtual speaker, and the second virtual speaker signal.

The encoder can obtain the attribute information of the first target virtual speaker, and the first target virtual speaker is a virtual speaker that is in the virtual speaker set and that is used to play back the first virtual speaker signal. The encoder can obtain the attribute information of the second target virtual speaker, and the second target virtual speaker is a virtual speaker that is in the virtual speaker set and that is used to play back the second virtual speaker signal. The attribute information of the first target virtual speaker may include the location information of the first target virtual speaker and the HOA coefficient for the first target virtual speaker. The attribute information of the second target virtual speaker may include the location information of the second target virtual speaker and the HOA coefficient for the second target virtual speaker. After the encoder obtains the first virtual speaker signal and the second virtual speaker signal, the encoder performs signal reconstruction based on the attribute information of the first target virtual speaker and the attribute information of the second target virtual speaker, and can obtain the second scene audio signal through signal reconstruction.

In some embodiments of this application, the obtaining the second scene audio signal based on the attribute information of the first target virtual speaker, the first virtual speaker signal, the attribute information of the second target virtual speaker, and the second virtual speaker signal in H1 includes:

determining the HOA coefficient for the first target virtual speaker and the HOA coefficient for the second target virtual speaker; and performing synthesis processing on the first virtual speaker signal and the HOA coefficient for the first target virtual speaker, and performing synthesis processing on the second virtual speaker signal and the HOA coefficient for the second target virtual speaker.

The encoder first determines the HOA coefficient for the first target virtual speaker. For example, the encoder may pre-store the HOA coefficient for the first target virtual speaker, and the encoder determines the HOA coefficient for the second target virtual speaker. For example, the encoder may pre-store the HOA coefficient for the second target virtual speaker, and the encoder generates a reconstructed scene audio signal based on the first virtual speaker signal, the HOA coefficient for the first target virtual speaker, the second virtual speaker signal, and the HOA coefficient for the second target virtual speaker.

In some embodiments of this application, the audio encoding method performed by the encoder may further include the following operation:

I1: aligning the first virtual speaker signal and the second virtual speaker signal, to obtain an aligned first virtual speaker signal and an aligned second virtual speaker signal.

When I1 is performed, in an embodiment, the encoding the second virtual speaker signal in D3 includes:

encoding the aligned second virtual speaker signal.

In an embodiment, the encoding the first virtual speaker signal and the residual signal in 405 includes:

encoding the aligned first virtual speaker signal and the residual signal.

The encoder can generate the first virtual speaker signal and the second virtual speaker signal, and the encoder can align the first virtual speaker signal and the second virtual speaker signal to obtain the aligned first virtual speaker signal and the aligned second virtual speaker signal. For example, there are two virtual speaker signals, if a sound channel sequence of the virtual speaker signals of a current frame is 1 and 2, respectively corresponding to virtual speaker signals generated by target virtual speakers P1 and P2, and a sound channel sequence of the virtual speaker signals of a previous frame is 1 and 2, respectively corresponding to virtual speaker signals generated by target virtual speakers P2 and P1, the sound channel sequence of the virtual speaker signals of the current frame can be adjusted based on the sequence of the target virtual speakers of the previous frame. For example, the sound channel sequence of the virtual speaker signals of the current frame is adjusted to 2 and 1, so that virtual speaker signals generated by a same target virtual speaker are on a same sound channel.

After obtaining the aligned first virtual speaker signal, the encoder can encode the aligned first virtual speaker signal and the residual signal. In this embodiment of this application, inter-channel correlation is enhanced by adjusting and aligning sound channels of the first virtual speaker signal again, to facilitate encoding processing of the first virtual speaker signal by the core encoder.

In some embodiments of this application, in addition to performing the foregoing operations by the encoder, the audio encoding method provided in this embodiment of this application further includes:

D1: selecting the second target virtual speaker from the virtual speaker set based on the first scene audio signal; and D2: generating the second virtual speaker signal based on the first scene audio signal and the attribute information of the second target virtual speaker.

In an embodiment, when the encoder performs D1 and D2, the encoding the first virtual speaker signal and the residual signal in 405 includes the following operations.

J1: Obtaining a downmixed signal and first side information based on the first virtual speaker signal and the second virtual speaker signal, where the first side information indicates a relationship between the first virtual speaker signal and the second virtual speaker signal.

In this embodiment of the present invention, the relationship between the first virtual speaker signal and the second virtual speaker signal may be a direct relationship or an indirect relationship. For example, when the relationship between the first virtual speaker signal and the second virtual speaker signal is the direct relationship, the first side information may include a correlation parameter between the first virtual speaker signal and the second virtual speaker signal, for example, may be an energy proportion parameter between the first virtual speaker signal and the second virtual speaker signal. For example, when the relationship between the first virtual speaker signal and the second virtual speaker signal is the indirect relationship, the first side information may include a correlation parameter between the first virtual speaker signal and the downmixed signal, and a correlation parameter between the second virtual speaker signal and the downmixed signal, for example, include an energy proportion parameter between the first virtual speaker signal and the downmixed signal, and an energy proportion parameter between the second virtual speaker signal and the downmixed signal.

When the relationship between the first virtual speaker signal and the second virtual speaker signal may be the direct relationship, the decoder can determine the first virtual speaker signal and the second virtual speaker signal based on the downmixed signal, a manner for obtaining the downmixed signal, and the direct relationship. When the relationship between the first virtual speaker signal and the second virtual speaker signal may be the indirect relationship, the decoder can determine the first virtual speaker signal and the second virtual speaker signal based on the downmixed signal and the indirect relationship.

J2: Encoding the downmixed signal, the first side information, and the residual signal.

After the encoder obtains the first virtual speaker signal and the second virtual speaker signal, the encoder can further perform downmixing based on the first virtual speaker signal and the second virtual speaker signal to generate the downmixed signal, for example, perform amplitude downmixing on the first virtual speaker signal and the second virtual speaker signal to obtain the downmixed signal. In addition, the first side information can be further generated based on the first virtual speaker signal and the second virtual speaker signal. The first side information indicates the relationship between the first virtual speaker signal and the second virtual speaker signal, and the relationship has a plurality of embodiments. The first side information can be used by the decoder to upmix the downmixed signal, to restore the first virtual speaker signal and the second virtual speaker signal. For example, the first side information includes a signal information loss analysis parameter, so that the decoder restores the first virtual speaker signal and the second virtual speaker signal by using the signal information loss analysis parameter. For another example, the first side information may be a correlation parameter between the first virtual speaker signal and the second virtual speaker signal, for example, may be an energy proportion parameter between the first virtual speaker signal and the second virtual speaker signal. Therefore, the decoder restores the first virtual speaker signal and the second virtual speaker signal by using the correlation parameter or the energy proportion parameter.

In some embodiments of this application, when the encoder performs D1 and D2, the encoder may further perform the following operation:

I1: aligning the first virtual speaker signal and the second virtual speaker signal, to obtain an aligned first virtual speaker signal and an aligned second virtual speaker signal.

When I1 is performed, in an embodiment, the obtaining a downmixed signal and first side information based on the first virtual speaker signal and the second virtual speaker signal in J1 includes:

obtaining the downmixed signal and the first side information based on the aligned first virtual speaker signal and the aligned second virtual speaker signal.

In an embodiment, the first side information indicates a relationship between the aligned first virtual speaker signal and the aligned second virtual speaker signal.

Before generating the downmixed signal, the encoder can first perform an alignment operation on the virtual speaker signals, and after completing the alignment operation, generate the downmixed signal and the first side information. In this embodiment of this application, inter-channel correlation is enhanced by adjusting and aligning sound channels of the first virtual speaker signal and the second virtual speaker signal again, to facilitate encoding processing of the first virtual speaker signal by the core encoder.

It should be noted that in the foregoing embodiment of this application, the second scene audio signal can be obtained based on the first virtual speaker signal before alignment and the second virtual speaker signal before alignment, or can be obtained based on the aligned first virtual speaker signal and the aligned second virtual speaker signal. An embodiment depends on an application scene, and is not limited herein.

In some embodiments of this application, before the selecting the second target virtual speaker from the virtual speaker set based on the first scene audio signal in D1, the audio signal encoding method provided in this embodiment of this application further includes:

K1: determining, based on an encoding rate and/or signal class information of the first scene audio signal, whether a target virtual speaker other than the first target virtual speaker needs to be obtained; and K2: selecting the second target virtual speaker from the virtual speaker set based on the first scene audio signal only if the target virtual speaker other than the first target virtual speaker needs to be obtained.

The encoder can further select a signal to determine whether the second target virtual speaker needs to be obtained. When the second target virtual speaker needs to be obtained, the encoder may generate the second virtual speaker signal. When the second target virtual speaker does not need to be obtained, the encoder may not generate the second virtual speaker signal. The encoder can determine, based on the configuration information of the audio encoder and/or the signal class information of the first scene audio signal, whether another target virtual speaker needs to be selected in addition to the first target virtual speaker. For example, if the encoding rate is higher than a preset threshold, it is determined that target virtual speakers corresponding to two major sound field components need to be obtained, and in addition to that the first target virtual speaker is determined, the second target virtual speaker may be further determined. For another example, if it is determined, based on the signal class information of the first scene audio signal, that target virtual speakers corresponding to two major sound field components including a dominant sound source direction need to be obtained, in addition to that the first target virtual speaker is determined, the second target virtual speaker may be further determined. On the contrary, if it is determined, based on the encoding rate and/or the signal class information of the first scene audio signal, that only one target virtual speaker needs to be obtained, after the first target virtual speaker is determined, it is determined that no target virtual speaker other than the first target virtual speaker is obtained. In this embodiment of this application, a signal is selected, so that an amount of data encoded by the encoder can be reduced, to improve encoding efficiency.

When selecting the signal, the encoder can determine whether the second virtual speaker signal needs to be generated. Because information loss occurs when the encoder selects the signal, signal compensation needs to be performed on a virtual speaker signal that is not transmitted. The signal compensation may be and is not limited to information loss analysis, energy compensation, envelope compensation, and noise compensation. A compensation method may be linear compensation, nonlinear compensation, or the like. After the signal compensation, the first side information can be generated, and the first side information can be written into the bitstream, so that the decoder can obtain the first side information by using the bitstream, and the decoder can perform signal compensation based on the first side information, to improve quality of a decoded signal of the decoder.

In some embodiments of this application, for signal selection, in addition to selecting whether the second virtual speaker signal needs to be generated, the encoder may further perform signal selection for the residual signal, to determine which residual sub-signals in the residual signal are to be transmitted. For example, the residual signal includes residual sub-signals on at least two sound channels, and the audio signal encoding method provided in this embodiment of this application further includes:

L1: determining, from the residual sub-signals on the at least two sound channels based on the configuration information of the audio encoder and/or the signal class information of the first scene audio signal, a residual sub-signal that needs to be encoded and that is on at least one sound channel.

In an implementation scene in which L1 is performed, in an embodiment, the encoding the first virtual speaker signal and the residual signal in 405 includes:

encoding the first virtual speaker signal and the residual sub-signal that needs to be encoded and that is on the at least one sound channel.

The encoder can make a decision on the residual signal based on the configuration information of the audio encoder and/or the signal class information of the first scene audio signal. For example, if the residual signal includes the residual sub-signals on the at least two sound channels, the encoder can select a sound channel or sound channels on which residual sub-signals need to be encoded and a sound channel or sound channels on which residual sub-signals do not need to be encoded. For example, a residual sub-signal with dominant energy in the residual signal is selected based on the configuration information of the audio encoder for encoding. For another example, a residual sub-signal obtained through calculation by a low-order HOA sound channel in the residual signal is selected based on the signal class information of the first scene audio signal for encoding. For the residual signal, a sound channel is selected, so that an amount of data encoded by the encoder can be reduced, to improve encoding efficiency.

In some embodiments of this application, if the residual sub-signals on the at least two sound channels include a residual sub-signal that does not need to be encoded and that is on at least one sound channel, the audio signal encoding method provided in this embodiment of this application further includes:

obtaining second side information, where the second side information indicates a relationship between the residual sub-signal that needs to be encoded and that is on the at least one sound channel and the residual sub-signal that does not need to be encoded and that is on the at least one sound channel; and writing the second side information into the bitstream.

When selecting a signal, the encoder can determine a residual sub-signal that needs to be encoded and a residual sub-signal that does not need to be encoded. In this embodiment of this application, the residual sub-signal that needs to be encoded is encoded, and the residual sub-signal that does not need to be encoded is not encoded, so that an amount of data encoded by the encoder can be reduced, to improve encoding efficiency. Because information loss occurs when the encoder selects the signal, signal compensation needs to be performed on a residual sub-signal that is not transmitted. The signal compensation may be and is not limited to information loss analysis, energy compensation, envelope compensation, and noise compensation. A compensation method may be linear compensation, nonlinear compensation, or the like. After signal compensation, the second side information may be generated, and the second side information may be written into the bitstream. The second side information indicates a relationship between a residual sub-signal that needs to be encoded and a residual sub-signal that does not need to be encoded. The relationship has a plurality of embodiments. For example, the second side information includes a signal information loss analysis parameter, so that the decoder restores, by using the signal information loss analysis parameter, the residual sub-signal that needs to be encoded and the residual sub-signal that does not need to be encoded. For another example, the second side information may be a correlation parameter between the residual sub-signal that needs to be encoded and the residual sub-signal that does not need to be encoded, for example, may be an energy proportion parameter between the residual sub-signal that needs to be encoded and the residual sub-signal that does not need to be encoded. Therefore, the decoder restores, by using the correlation parameter or the energy proportion parameter, the residual sub-signal that needs to be encoded and the residual sub-signal that does not need to be encoded. In this embodiment of this application, the decoder can obtain the second side information by using the bitstream, and the decoder can perform signal compensation based on the second side information, to improve quality of a decoded signal of the decoder.

According to the example description in the foregoing embodiment, in this embodiment of this application, the first target virtual speaker can be configured for the first scene audio signal. In addition, the audio encoder can further obtain the residual signal based on the first virtual speaker signal and the attribute information of the first target virtual speaker. The audio encoder encodes the first virtual speaker signal and the residual signal, instead of directly encoding the first scene audio signal. In this embodiment of this application, the first target virtual speaker is selected based on the first scene audio signal, and the first virtual speaker signal generated based on the first target virtual speaker can represent a sound field at a location of a listener in space. The sound field at the location is as close as possible to an original sound field when the first scene audio signal is recorded, thereby ensuring encoding quality of the audio encoder. In addition, the first virtual speaker signal and the residual signal are encoded to obtain the bitstream, and an amount of encoded data of the first virtual speaker signal is related to the first target virtual speaker, and is unrelated to a quantity of sound channels of the first scene audio signal, so that the amount of encoded data is reduced, and encoding efficiency is improved.

In this embodiment of this application, the encoder encodes the first virtual speaker signal and the residual signal to generate the bitstream. Then, the encoder can output the bitstream, and send the bitstream to the decoder through an audio transmission channel. The decoder performs subsequent operations 411 to 413.

411: Receiving the bitstream.

The decoder receives the bitstream from the encoder. The bitstream can carry an encoded first virtual speaker signal and an encoded residual signal. The bitstream may further carry the encoded attribute information of the first target virtual speaker. This is not limited. It should be noted that the bitstream may not carry the attribute information of the first target virtual speaker. In this case, the decoder can determine the attribute information of the first target virtual speaker through pre-configuration.

In addition, in some embodiments of this application, when the encoder generates the second virtual speaker signal, the bitstream may further carry the second virtual speaker signal. The bitstream may further carry encoded attribute information of the second target virtual speaker. This is not limited. It should be noted that the bitstream may not carry the attribute information of the second target virtual speaker. In this case, the decoder can determine the attribute information of the second target virtual speaker through pre-configuration.

412: Decoding the bitstream to obtain a virtual speaker signal and a residual signal.

After receiving the bitstream from the encoder, the decoder decodes the bitstream, and obtains the virtual speaker signal and the residual signal from the bitstream.

It should be noted that the virtual speaker signal may be the first virtual speaker signal, or may be the first virtual speaker signal and the second virtual speaker signal, which is not limited herein.

In some embodiments of this application, after the decoder performs 411 and 412, the audio decoding method provided in this embodiment of this application further includes the following operation:

decoding the bitstream to obtain attribute information of the target virtual speaker.

In addition to encoding a virtual speaker, the encoder can also encode the attribute information of the target virtual speaker, and write encoded attribute information of the target virtual speaker into the bitstream. For example, the attribute information of the first target virtual speaker can be obtained by using the bitstream. In this embodiment of this application, the bitstream can carry the encoded attribute information of the first target virtual speaker, so that the decoder can determine the attribute information of the first target virtual speaker by decoding the bitstream, to facilitate audio decoding by the decoder.

413: Obtaining a reconstructed scene audio signal based on the attribute information of the target virtual speaker, the residual signal, and the virtual speaker signal.

The decoder can obtain the attribute information of the target virtual speaker and the residual signal. The target virtual speaker is a virtual speaker that is in a virtual speaker set and that is used to play back the reconstructed scene audio signal. The attribute information of the target virtual speaker may include location information of the target virtual speaker and an HOA coefficient for the target virtual speaker. After obtaining the virtual speaker signal, the decoder performs signal reconstruction based on the attribute information of the target virtual speaker and the residual signal, and can output the reconstructed scene audio signal through signal reconstruction. The virtual speaker signal is used to reconstruct a major sound field component in a scene audio signal, and the residual signal compensates for a non-directional component in the reconstructed scene audio signal. The residual signal can improve quality of the reconstructed scene audio signal.

In some embodiments of this application, the attribute information of the target virtual speaker includes the HOA coefficient for the target virtual speaker.

The obtaining a reconstructed scene audio signal based on the attribute information of the target virtual speaker, the residual signal, and the virtual speaker signal in 413 includes:

performing synthesis processing on the virtual speaker signal and the HOA coefficient for the target virtual speaker to obtain a synthesized scene audio signal; and adjusting the synthesized scene audio signal by using the residual signal to obtain the reconstructed scene audio signal.

The decoder first determines the HOA coefficient for the target virtual speaker. For example, the decoder may prestore the HOA coefficient for the target virtual speaker. After obtaining the virtual speaker signal and the HOA coefficient for the target virtual speaker, the decoder can obtain the synthesized scene audio signal based on the virtual speaker signal and the HOA coefficient for the target virtual speaker. Finally, the residual signal is used to adjust the synthesized scene audio signal, to improve quality of the reconstructed scene audio signal.

For example, the HOA coefficient for the target virtual speaker is represented by a matrix A', a size of the matrix A' is (M×C), C is a quantity of target virtual speakers, and M is a quantity of sound channels of an N-order HOA coefficient. The virtual speaker signal is represented by a matrix W', and a size of the matrix W' is (C×L), where L represents a quantity of signal sampling points. A reconstructed HOA signal is obtained by using the following formula:

$$H=A'W'.$$

H obtained by using the foregoing calculation formula is the reconstructed HOA signal.

After the foregoing reconstructed HOA signal is obtained, the residual signal can be further used to adjust the synthesized scene audio signal, to improve quality of the reconstructed scene audio signal.

In some embodiments of this application, the attribute information of the target virtual speaker includes the location information of the target virtual speaker.

The obtaining a reconstructed scene audio signal based on the attribute information of the target virtual speaker, the residual signal, and the virtual speaker signal in 413 includes:

determining the HOA coefficient for the target virtual speaker based on the location information of the target virtual speaker;

performing synthesis processing on the virtual speaker signal and the HOA coefficient for the target virtual speaker to obtain a synthesized scene audio signal; and adjusting the synthesized scene audio signal by using the residual signal to obtain the reconstructed scene audio signal.

The attribute information of the target virtual speaker may include the location information of the target virtual speaker. The decoder pre-stores an HOA coefficient for each virtual speaker in the virtual speaker set, and the decoder further stores location information of each virtual speaker. For example, the decoder can determine, based on a correspondence between location information of a virtual speaker and an HOA coefficient for the virtual speaker, the HOA coefficient for the location information of the target virtual speaker, or the decoder can calculate the HOA coefficient for the target virtual speaker based on the location information of the target virtual speaker. Therefore, the decoder can determine the HOA coefficient for the target virtual speaker based on the location information of the target virtual speaker. This resolves a problem that the decoder needs to determine the HOA coefficient for the target virtual speaker.

In some embodiments of this application, it can be learned from the method description of the encoder that the virtual speaker signal is a downmixed signal obtained by downmixing the first virtual speaker signal and the second virtual speaker signal. In this implementation scene, the audio decoding method provided in this embodiment of this application further includes:

decoding the bitstream to obtain first side information, where the first side information indicates a relationship between the first virtual speaker signal and the second virtual speaker signal; and obtaining the first virtual speaker signal and the second virtual speaker signal based on the first side information and the downmixed signal.

In an embodiment, the obtaining a reconstructed scene audio signal based on the attribute information of the target virtual speaker, the residual signal, and the virtual speaker signal in 413 includes:

obtaining the reconstructed scene audio signal based on the attribute information of the target virtual speaker, the residual signal, the first virtual speaker signal, and the second virtual speaker signal.

The encoder generates the downmixed signal when performing downmixing based on the first virtual speaker signal and the second virtual speaker signal, and the encoder can further perform signal compensation for the downmixed signal, to generate the first side information. The first side information can be written into the bitstream. The decoder can obtain the first side information by using the bitstream. The decoder can perform signal compensation based on the first side information, to obtain the first virtual speaker signal and the second virtual speaker signal. Therefore, during signal reconstruction, the first virtual speaker signal, the second virtual speaker signal, the attribute information of the target virtual speaker, and the residual signal can be used, to improve quality of a decoded signal of the decoder.

In some embodiments of this application, it can be learned from the method description of the encoder that the encoder performs signal selection for the residual signal, and adds second side information to the bitstream. In this implementation scene, it is assumed that the residual signal includes a residual sub-signal on a first sound channel, the audio decoding method provided in this embodiment of this application further includes:

decoding the bitstream to obtain the second side information, where the second side information indicates a relationship between the residual sub-signal on the first sound channel and a residual sub-signal on a second sound channel; and obtaining the residual sub-signal on the second sound channel based on the second side information and the residual sub-signal on the first sound channel.

In an embodiment, the obtaining a reconstructed scene audio signal based on the attribute information of the target virtual speaker, the residual signal, and the virtual speaker signal in 413 includes:

obtaining the reconstructed scene audio signal based on the attribute information of the target virtual speaker, the residual sub-signal on the first sound channel, the residual sub-signal on the second sound channel, and the virtual speaker signal.

When selecting a signal, the encoder can determine a residual sub-signal that needs to be encoded and a residual sub-signal that does not need to be encoded. Because information loss occurs when the encoder selects the signal, the encoder generates the second side information. The second side information can be written into the bitstream. The decoder can obtain the second side information by using the bitstream. It is assumed that the residual signal carried in the bitstream includes the residual sub-signal on the first sound channel, the decoder can perform signal compensation based on the second side information to obtain the residual sub-signal on the second sound channel. For example, the decoder restores the residual sub-signal on the second sound channel by using the residual sub-signal on the first sound channel and the second side information. The second sound channel is independent of the first sound channel. Therefore, during signal reconstruction, the residual sub-signal on the first sound channel, the residual sub-signal on the second sound channel, the attribute information of the target virtual speaker, and the virtual speaker signal can be used, to improve quality of a decoded signal of the decoder. For example, a scene audio signal includes 16 sound channels in total. There are four first sound channels, for example, sound channels 1, 3, 5, and 7 in the 16 sound channels, and the second side information describes relationships between residual sub-signals on the sound channels 1, 3, 5, and 7 and residual sub-signals on other sound channels. Therefore, the decoder can obtain residual sub-signals on the other 12 sound channels in the 16 sound channels based on the residual sub-signals on the first sound channels and the second side information. For another example, a scene audio signal includes 16 sound channels in total. A first sound channel is a third sound channel in the 16 sound channels, a second sound channel is an eighth sound channel in the 16 sound channels, and the second side information describes a relationship between a residual sub-signal on the third sound channel and a residual sub-signal on the eighth sound channel. Therefore, the decoder can obtain the residual sub-signal on the eighth sound channel based on the residual sub-signal on the third sound channel and the second side information.

In some embodiments of this application, it can be learned from the method description of the encoder that the encoder performs signal selection for the residual signal, and adds second side information to the bitstream. In this implementation scene, it is assumed that the residual signal includes a residual sub-signal on a first sound channel, the audio decoding method provided in this embodiment of this application further includes:

decoding the bitstream to obtain the second side information, where the second side information indicates a relationship between the residual sub-signal on the first sound channel and a residual sub-signal on a third sound channel; and obtaining the residual sub-signal on the third sound channel and an updated residual sub-signal on the first sound channel based on the second side information and the residual sub-signal on the first sound channel.

In an embodiment, the obtaining a reconstructed scene audio signal based on the attribute information of the target virtual speaker, the residual signal, and the virtual speaker signal in 413 includes:

obtaining the reconstructed scene audio signal based on the attribute information of the target virtual speaker, the updated residual sub-signal on the first sound channel, the residual sub-signal on the third sound channel, and the virtual speaker signal.

There may be one or more first sound channels, and there may be one or more second sound channels, or there may be one or more third sound channels.

When selecting a signal, the encoder can determine a residual sub-signal that needs to be encoded and a residual sub-signal that does not need to be encoded. Because information loss occurs when the encoder selects the signal, the encoder generates the second side information. The second side information can be written into the bitstream. The decoder can obtain the second side information by using the bitstream. It is assumed that the residual signal carried in the bitstream includes the residual sub-signal on the first sound channel, the decoder can perform signal compensation based on the second side information to obtain the residual sub-signal on the third sound channel. The residual sub-signal on the third sound channel is different from the residual sub-signal on the first sound channel. When the residual sub-signal on the third sound channel is obtained based on the second side information and the residual sub-signal on the first sound channel, the residual sub-signal on the first sound channel needs to be updated, to obtain the updated residual sub-signal on the first sound channel. For example, the decoder generates the residual sub-signal on the third sound channel and the updated residual sub-signal on the first sound channel by using the residual sub-signal on the first sound channel and the second side information. Therefore, during signal reconstruction, the residual sub-signal on the third sound channel, the updated residual sub-signal on the first sound channel, the attribute information of the target virtual speaker, and the virtual speaker signal can be used, to improve quality of a decoded signal of the decoder. For example, a scene audio signal includes 16 sound channels in total. There are four first sound channels, for example, sound channels 1, 3, 5, and 7 in the 16 sound channels, and the second side information describes relationships between residual sub-signals on the sound channels 1, 3, 5, and 7 and residual sub-signals on other sound channels. Therefore, the decoder can obtain the residual sub-signals on the 16 sound channels based on the residual sub-signals on the first sound channels and the second side information, and the residual sub-signals on the 16 sound channels include updated residual sub-signals on the sound channels 1, 3, 5, and 7. For another example, a scene audio signal includes 16 sound channels in total. A first sound channel is a third sound channel in the 16 sound channels, a second sound channel is an eighth sound channel in the 16 sound channels, and the second side information describes a relationship between a residual sub-signal on the third sound channel and a residual sub-signal on the eighth sound channel. Therefore, the decoder can obtain, based on the residual sub-signal on the third sound channel and the second side information, the residual sub-signal on the eighth sound channel and an updated residual sub-signal on the third sound channel.

In some embodiments of this application, it can be learned from the method description of the encoder that the bitstream generated by the encoder may carry both the first side information and the second side information. In this case, the decoder needs to decode the bitstream, to obtain the first side information and the second side information, and the decoder needs to use the first side information to perform signal compensation, and further needs to use the second side information to perform signal compensation. In other words, the decoder may perform signal compensation based on the first side information and the second side information, to obtain a signal-compensated virtual speaker signal and a signal-compensated residual signal. Therefore, during signal reconstruction, the signal-compensated virtual speaker signal and a signal-compensated residual signal can be used, to improve quality of a decoded signal of the decoder.

In the description of the example in the foregoing embodiment, the bitstream is first received, and then is decoded to obtain the virtual speaker signal and the residual signal, and finally the reconstructed scene audio signal is obtained based on the attribute information of the target virtual speaker, the residual signal, and the virtual speaker signal. In this embodiment of this application, the audio decoder performs a decoding process that is reverse to the encoding process by the audio encoder, and can obtain the virtual speaker signal and the residual signal from the bitstream through decoding, and obtain the reconstructed scene audio signal by using the attribute information of the target virtual speaker, the residual signal, and the virtual speaker signal. In this embodiment of this application, the obtained bitstream carries the virtual speaker signal and the residual signal, to reduce an amount of decoded data and improve decoding efficiency.

For example, in this embodiment of this application, compared with the first scene audio signal, the first virtual speaker signal is represented by using fewer sound channels. For example, the first scene audio signal is a 3-order HOA signal, and the HOA signal has 16 sound channels. In this embodiment of this application, the 16 sound channels can be compressed into four sound channels. The four sound channels include two sound channels occupied by the virtual speaker signal generated by the encoder and two sound channels occupied by the residual signal. For example, the virtual speaker signal generated by the encoder may include the first virtual speaker signal and the second virtual speaker signal, and a quantity of sound channels of the virtual speaker signal generated by the encoder is unrelated to the quantity of the sound channels of the first scene audio signal. It can be known from the description in subsequent operations that, a bitstream may carry virtual speaker signals on two sound channels and residual signals on two sound channels. In an embodiment, the decoder receives the bitstream, and decodes the bitstream to obtain the virtual speaker signals on two sound channels and the residual signals on two sound channels. The decoder can reconstruct scene audio signals on 16 sound channels by using the virtual speaker signals on the two sound channels and the residual signals on the two sound channels. This ensures that a reconstructed scene audio signal has equivalent subjective and objective quality when compared with an audio signal in an original scene.

For better understanding and implementation of the foregoing solution in this embodiment of this application, descriptions are provided below by using corresponding application scenes as examples.

In this embodiment of this application, an example in which a scene audio signal is an HOA signal is used. A sound wave is propagated in an ideal medium, a quantity of waves is k=w/c, an angular frequency is w=2πf, f is a sound wave frequency, and c is a sound speed. In this case, sound pressure p meets the following calculation formula, where $\nabla^2$ is a Laplace operator:

$$\nabla^2 p + k^2 p = 0.$$

The foregoing equation is solved under spherical coordinates. In a passive spherical region, a solution of the equation is as follows:

$$p(r,\theta,\varphi,k) = s\sum_{m=0}^{\infty}(2m+1)j^m j_m^{kr}(kr)\sum_{0\le n\le m,\sigma=\pm 1} Y_{m,n}^{\sigma}(\theta_s,\varphi_s)Y_{m,n}^{\sigma}(\theta,\varphi).$$

In the foregoing calculation formula, r represents a spherical radius, θ represents a horizontal angle, φ represents an elevation angle, k represents a quantity of waves, s is an amplitude of an ideal plane wave, m is a sequence number of an HOA order, $j^m j_m^{kr}(kr)$ is a spherical Bessel function, and is also referred to as a radial basis function, where the first j is an imaginary unit. $(2m+1)j^m j_m^{kr}(kr)$ does not vary with an angle. $Y_{m,n}^{\sigma}(\theta,\varphi)$ is a spherical harmonic function in a direction of θ, φ, and $Y_{m,n}^{\sigma}(\theta_s,\varphi_s)$ is a spherical harmonic function in a direction of a sound source.

An HOA coefficient may be expressed as: $B_{m,n}^{\sigma} = s \cdot Y_{m,n}^{\sigma}(\theta_s,\varphi_s)$.

The following calculation formula is provided:

$$p(r,\theta,\varphi,k) = \sum_{m=0}^{\infty} j^m j_m^{kr}(kr)\sum_{0\le n\le m,\sigma=\pm 1} B_{m,n}^{\sigma} Y_{m,n}^{\sigma}(\theta_s,\varphi_s)Y_{m,n}^{\sigma}(\theta,\varphi).$$

The above calculation formula shows that a sound field can be expanded on a spherical surface according to the spherical harmonic function and expressed by using a coefficient $B_{m,n}^{\sigma}$. Alternatively, the sound field can be reconstructed if the coefficient $B_{m,n}^{\sigma}$ is known. The foregoing formula is truncated to the $N^{th}$ term, and the coefficient $B_{m,n}^{\sigma}$ is used as an approximate description of the sound field, and is referred to as an N-order HOA coefficient. The HOA coefficient may also be referred to as an ambisonic coefficient. The N-order HOA coefficient has $(N+1)^2$ sound channels in total. An ambisonic signal of more than one order is also referred to as an HOA signal. By superposing spherical harmonic functions according to a coefficient for a sampling point of the HOA signal, a spatial sound field at a moment corresponding to the sampling point can be reconstructed.

For example, in a configuration, an HOA order may be 2 to 6, and when audio in a scene is recorded, a signal sampling rate is 48 kHz to 192 kHz, and a sampling depth is 16 bits or 24 bits. An HOA signal is characterized by spatial information of a sound field, and is a description of certain precision of a sound field signal at a point in space. Therefore, it can be considered that another representation form is used to describe the sound field signal at the point. If this description method can use less data amount to describe the signal at the point with the same precision, the purpose of signal compression can be achieved.

A sound field in space can be decomposed into superposition of a plurality of plane waves. Therefore, a sound field expressed by an HOA signal can be expressed by using superposition of a plurality of plane waves, and each plane wave is represented by using an audio signal on one sound channel and a direction vector. If a representation form of superimposed plane waves can better express an original sound field by using fewer sound channels, signal compression can be achieved.

During actual playback, an HOA signal may be played back by using a headset, or may be played back by using a plurality of speakers arranged in a room. When the speakers are used for playback, a basic method is to superimpose sound fields of the plurality of speakers, so that a sound field at a point (a location of a listener) in space is as close as possible to an original sound field under a standard when the HOA signal is recorded. In this embodiment of this application, it is assumed that a virtual speaker array is used. Then, a playback signal of the virtual speaker array is calculated, the playback signal is used as a transmission signal, and a compressed signal is generated. The decoder decodes a bitstream to obtain the playback signal, and reconstructs a scene audio signal by using the playback signal.

An embodiment of this application provides an encoder applicable to encoding of a scene audio signal and a decoder applicable to decoding of a scene audio signal. The encoder encodes an original HOA signal into a compressed bitstream, the encoder sends the compressed bitstream to the decoder, and then the decoder restores the compressed bitstream to a reconstructed HOA signal. In this embodiment of this application, an amount of data obtained after compression performed by the encoder is as small as possible, or quality of an HOA signal obtained after reconstruction performed by the decoder at a same bit rate is higher.

In this embodiment of this application, a problem of a large data amount, high bandwidth occupation, low compression efficiency, and low encoding quality during encoding of the HOA signal can be resolved. Because the N-order HOA signal has $(N+1)^2$ sound channels, high bandwidth needs to be consumed for directly transmitting the HOA signal. Therefore, an effective multi-channel encoding scheme is required.

Figure 5:
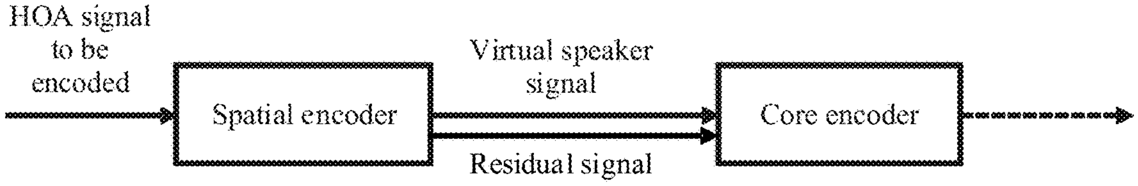
FIG. 5 is a schematic diagram of a structure of an encoder according to an embodiment of this application.
Figure 6:
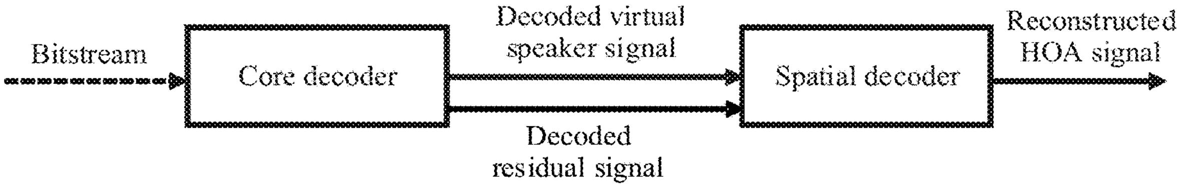
FIG. 6 is a schematic diagram of a structure of a decoder according to an embodiment of this application.

In this embodiment of this application, different sound channel extraction methods are used, and an assumption of a sound source is not limited in this embodiment of this application, and does not depend on an assumption of a single sound source in time-frequency domain, so that a complex scene such as signals of a plurality of sound sources can be more effectively processed. The encoder and decoder in this embodiment of this application are applicable to a spatial encoding and decoding method in which fewer sound channels are used to indicate an original HOA signal. FIG. 5 is a schematic diagram of a structure of the encoder according to this embodiment of this application. The encoder includes a spatial encoder and a core encoder. The spatial encoder may perform sound channel extraction on an HOA signal to be encoded to generate a virtual speaker signal. The core encoder may encode the virtual speaker signal to obtain a bitstream. The encoder sends the bitstream to a decoder. FIG. 6 is a schematic diagram of a structure of the decoder according to this embodiment of this application. The decoder includes a core decoder and a spatial decoder. The core decoder first receives a bitstream from an encoder, and then decodes the bitstream to obtain a virtual speaker signal. Then, the spatial decoder reconstructs the virtual speaker signal to obtain a reconstructed HOA signal.

The following separately describes examples from the encoder and the decoder.

Figure 7:
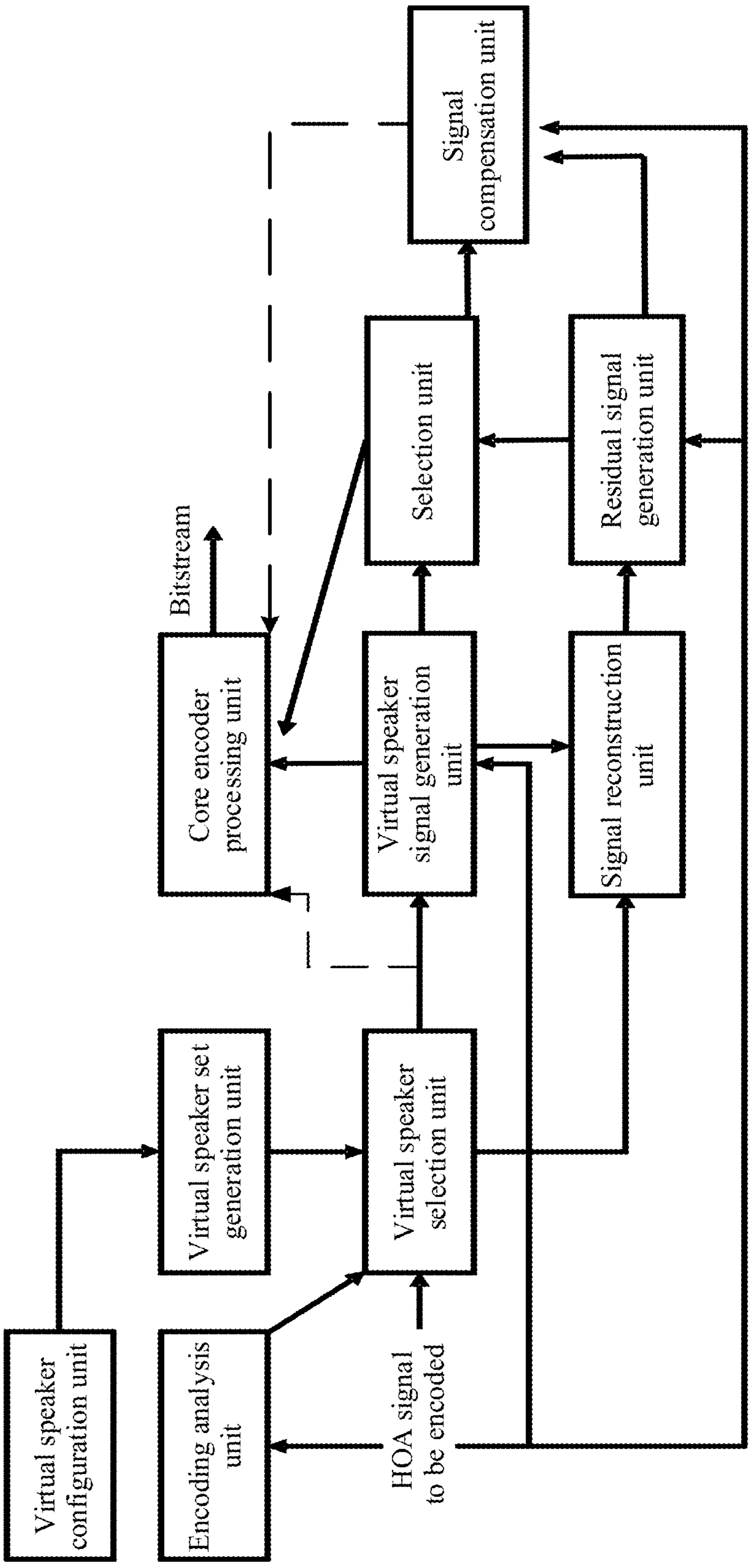
FIG. 7 is a schematic diagram of a structure of another encoder according to an embodiment of this application.

As shown in FIG. 7, the encoder provided in this embodiment of this application is first described. The encoder may include a virtual speaker configuration unit, an encoding analysis unit, a virtual speaker set generation unit, a virtual speaker selection unit, a virtual speaker signal generation unit, a core encoder processing unit, a signal reconstruction unit, a residual signal generation unit, a selection unit, and a signal compensation unit. The following separately describes a function of each component unit of the encoder. In this embodiment of this application, the encoder shown in FIG. 7 may generate one virtual speaker signal, or may generate a plurality of virtual speaker signals. A process of generating the plurality of virtual speaker signals may be implemented by performing generating for a plurality of times according to the encoder structure shown in FIG. 7. The following uses a process of generating one virtual speaker signal as an example.

The virtual speaker configuration unit is configured to configure virtual speakers in a virtual speaker set to obtain a plurality of virtual speakers.

The virtual speaker configuration unit outputs a virtual speaker configuration parameter based on configuration information of an encoder. The configuration information of the encoder includes but is not limited to an HOA order, an encoding bit rate, and user-defined information. The virtual speaker configuration parameter includes but is not limited to a quantity of virtual speakers, an HOA order of the virtual speaker, and location coordinates of the virtual speaker.

The virtual speaker configuration parameter output by the virtual speaker configuration unit is used as an input of the virtual speaker set generation unit.

The encoding analysis unit is configured to perform encoding analysis on an HOA signal to be encoded, for example, analyze sound field distribution of the HOA signal to be encoded, including characteristics such as a quantity of sound sources, directivity, and dispersion of the HOA signal to be encoded, which are used as one of determining conditions for determining how to select a target virtual speaker.

In this embodiment of this application, the encoder may not include the encoding analysis unit, that is, the encoder may not analyze an input signal, and a default configuration is used to determine how to select the target virtual speaker. This is not limited.

The encoder obtains the HOA signal to be encoded, for example, may use an HOA signal recorded from an actual acquisition device or an HOA signal synthesized by using an artificial audio object as an input of the encoder, and the HOA signal to be encoded input by the encoder may be a time-domain HOA signal or a frequency-domain HOA signal.

The virtual speaker set generation unit is configured to generate a virtual speaker set. The virtual speaker set may include a plurality of virtual speakers, and the virtual speaker in the virtual speaker set may also be referred to as a “candidate virtual speaker”.

The virtual speaker set generation unit generates an HOA coefficient for a specified candidate virtual speaker. Generating an HOA coefficient for a candidate virtual speaker needs coordinates (that is, location coordinates or location information) of the candidate virtual speaker and an HOA order of the candidate virtual speaker. A method for determining the coordinates of the candidate virtual speaker includes but is not limited to generating K virtual speakers according to an equidistant rule, and generating, according to an auditory perception principle, K candidate virtual speakers that are not evenly distributed. The following gives an example of a method for generating a fixed quantity of virtual speakers that are evenly distributed.

Figure 8:
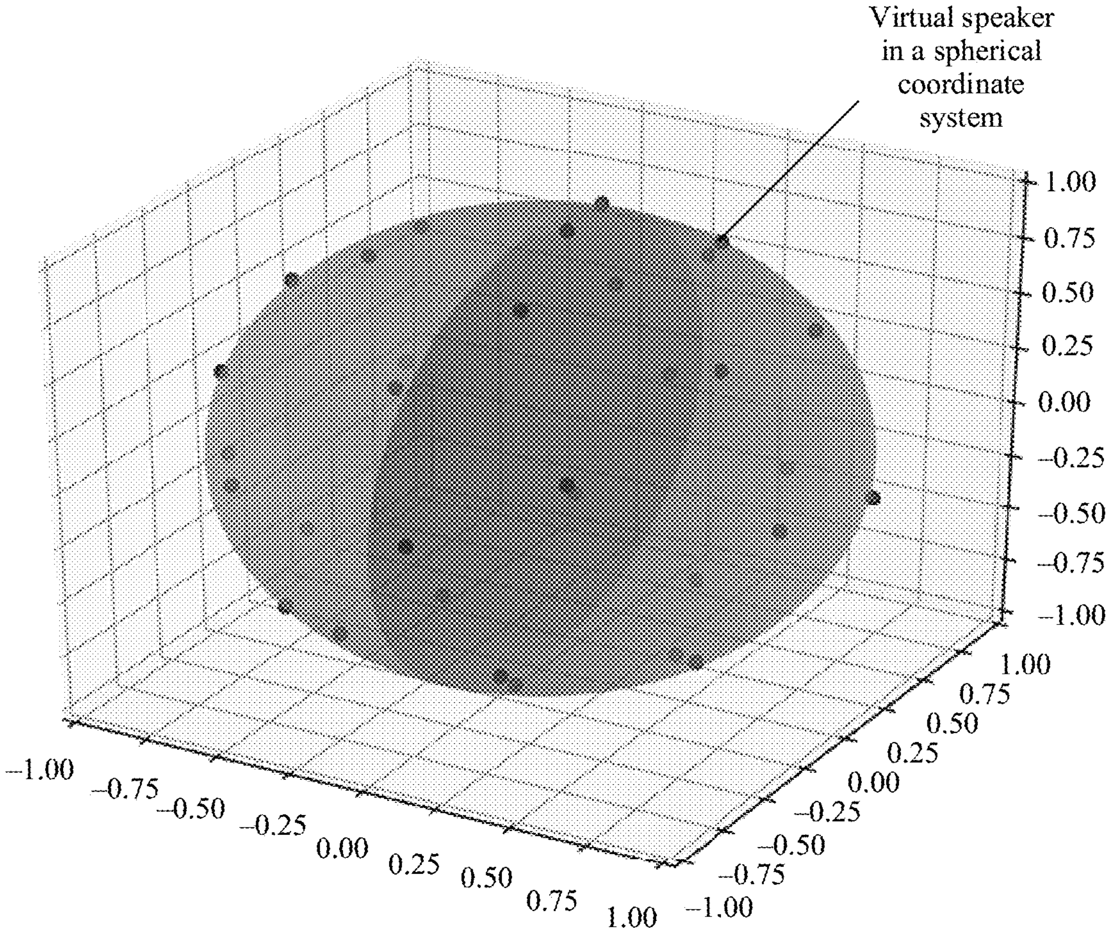
FIG. 8 is a schematic diagram of virtual speakers that are approximately evenly distributed on a sphere according to an embodiment of this application.

Coordinates of evenly-distributed candidate virtual speakers are generated based on a quantity of the candidate virtual speakers, for example, an approximately-uniform speaker arrangement is provided by using a numerical iteration calculation method. FIG. 8 is a schematic diagram of virtual loudspeakers that are approximately evenly distributed on a sphere. It is assumed that some material particles are distributed on a unit sphere, and a quadratic inversely-proportional repulsion force is set between these material particles, which is similar to an electrostatic repulsion force between same charges. These material particles are enabled to move freely under the repulsion force, it is expected that distribution of the material particles should be even when the material particles reach a steady state. In calculation, an actual physical law is simplified, and a motion distance of a material particle is directly equal to a stress. Therefore, for the $i^{th}$ material particle, a motion distance of the material particle in a step of iterative calculation, that is, a stressed virtual force is calculated by using the following formula:

$$\vec{D} = \vec{F} = \sum_{j=1, j\neq i}^{N} \frac{k}{r_{ij}^2} \vec{d}_{ij}.$$

$\vec{D}$ represents a displacement vector, $\vec{F}$ represents a force vector, $r_{ij}$ represents a distance between the $i^{th}$ material particle and the $j^{th}$ material particle, and $\vec{d}_{ij}$ represents a direction vector from the $j^{th}$ material particle to the $i^{th}$ material particle. A parameter k controls a size of a single step. An initial location of a material particle is randomly specified.

After moving according to the displacement vector $\vec{D}$, the material particle usually deviates from the unit sphere. Before next iteration, a distance between the material particle and a sphere center is normalized, and the material particle is moved back to the unit sphere. Therefore, the schematic diagram of the distribution of the virtual speakers shown in FIG. 8 may be obtained, where a plurality of virtual speakers are approximately evenly distributed on the sphere.

Next, an HOA coefficient for a candidate virtual speaker is generated. A form of an ideal plane wave whose amplitude is s and whose location coordinates of the speaker are $(\theta_s, \varphi_s)$ after the ideal plane wave is expanded by using a spherical harmonic function is the following calculation formula:

$$p(r, \theta, \varphi, k) = s\sum_{m=0}^{\infty}(2m+1)j^m j_m^{kr}(kr)\sum_{0\leq n\leq m, \sigma=\pm 1} Y_{m,n}^{\sigma}(\theta_s, \varphi_s) Y_{m,n}^{\sigma}(\theta, \varphi).$$

An HOA coefficient for the plane wave is $B_{m,n}^{\sigma}$, and meets the following calculation formula:

$$B_{m,n}^{\sigma} = s \cdot Y_{m,n}^{\sigma}(\theta_s, \varphi_s).$$

The HOA coefficients of the candidate virtual speakers output by the virtual speaker set generation unit are used as an input of the virtual speaker selection unit.

The virtual speaker selection unit is configured to select a target virtual speaker from a plurality of candidate virtual speakers in a virtual speaker set based on an HOA signal to be encoded. The target virtual speaker may be referred to as a "virtual speaker matching the HOA signal to be encoded", or referred to as a matched virtual speaker for short.

The virtual speaker selection unit matches the HOA signal to be encoded with the HOA coefficients of the candidate virtual speakers output by the virtual speaker set generation unit, and selects a specified matched virtual speaker.

The following describes a method for selecting a virtual speaker by using an example. In an embodiment, after the candidate virtual speakers are obtained, the HOA signal to be encoded is matched with the HOA coefficients of the candidate virtual speakers output by the virtual speaker set generation unit, to find the best matching of the HOA signal to be encoded on the candidate virtual speakers, and the objective is to match and combine the HOA signal to be encoded based on the HOA coefficients of the candidate virtual speakers. In an embodiment, an inner product is performed between the HOA coefficients of the candidate virtual speakers and the HOA signal to be encoded, a candidate virtual speaker with a maximum absolute value of the inner product is selected as the target virtual speaker, namely, the matched virtual speaker, a projection of the HOA signal to be encoded on the candidate virtual speaker is superimposed on a linear combination of the HOA coefficients of the candidate virtual speakers, and then a projection vector is subtracted from the HOA signal to be encoded to obtain a difference. The foregoing process is repeated for the difference to implement iterative calculation, a matched virtual speaker is generated each time of iteration, and coordinates of the matched virtual speakers and HOA coefficients of the target virtual speakers are output. It may be understood that a plurality of matched virtual speakers are selected, and one matched virtual speaker is generated each time of iteration.

The coordinates of the target virtual speaker and the HOA coefficient for the target virtual speaker that are output by the virtual speaker selection unit are used as inputs of the virtual speaker signal generation unit.

In some embodiments of this application, in addition to the composition units shown in FIG. 7, the encoder may further include a side information generation unit. The encoder may not include the side information generation unit, which is only an example herein. This is not limited.

The coordinates of the target virtual speaker and/or the HOA coefficient for the target virtual speaker output by the virtual speaker selection unit are used as an input of the side information generation unit.

The side information generation unit converts the HOA coefficient for the target virtual speaker or the coordinates of the target virtual speaker into side information, which facilitates processing and transmission by the core encoder.

An output of the side information generation unit is used as an input of the core encoder processing unit.

The virtual speaker signal generation unit is configured to generate a virtual speaker signal based on an HOA signal to be encoded and attribute information of a target virtual speaker.

The virtual speaker signal generation unit calculates the virtual speaker signal by using the HOA signal to be encoded and an HOA coefficient for the target virtual speaker.

The HOA coefficient for the target virtual speaker is represented by a matrix A, and the HOA signal to be encoded can be obtained through linear combination by using the matrix A. A theoretical optimal solution w, namely, the virtual speaker signal can be obtained by using a least square method. For example, the following calculation formula may be used:

$$w=A^{-1}X, \text{ where}$$

$A^{-1}$ represents an inverse matrix of the matrix A, a size of the matrix A is (M×C), C is a quantity of target virtual speakers, M is a quantity of sound channels of an N-order HOA coefficient, and a represents the HOA coefficient for the target virtual speaker. For example, $$A=\begin{bmatrix} a_{11} & \cdots & a_{1C} \\ \vdots & \ddots & \vdots \\ a_{M1} & \cdots & a_{MC} \end{bmatrix}.$$

X represents the HOA signal to be encoded, a size of the matrix X is (M×L), M is a quantity of sound channels of an N-order HOA coefficient, L is a quantity of sampling points, and x represents a coefficient for the HOA signal to be encoded. For example, $$X=\begin{bmatrix} x_{11} & \cdots & x_{1L} \\ \vdots & \ddots & \vdots \\ x_{M1} & \cdots & x_{ML} \end{bmatrix}.$$

The virtual speaker signal output by the virtual speaker signal generation unit is used as an input of the core encoder processing unit.

In some embodiments of this application, in addition to the composition units shown in FIG. 7, the encoder may further include a signal alignment unit. The encoder may not include the signal alignment unit, which is only an example herein. This is not limited.

The virtual speaker signal output by the virtual speaker signal generation unit is used as an input of the signal alignment unit.

The signal alignment unit is configured to readjust sound channels of the virtual speaker signal to enhance inter-channel correlation and facilitate processing by the core encoder.

An aligned virtual speaker signal output by the signal alignment unit is an input of the core encoder processing unit.

The signal reconstruction unit is configured to reconstruct an HOA signal by using a virtual speaker signal and an HOA coefficient for a target virtual speaker.

Composition of the HOA coefficient for the target virtual speaker is represented by a matrix A. A size of the matrix A is (M×C), and the matrix is denoted by A, where C is a quantity of matched virtual speakers, and M is a quantity of sound channels of an N-order HOA coefficient. The virtual speaker signal is represented by a matrix W, and a size of the matrix W is (C×L), where L represents a quantity of signal sampling points. Therefore, a reconstructed HOA signal T is:

$$T=AW.$$

The reconstructed HOA signal output by the signal reconstruction unit is an input of the residual signal generation unit.

The residual signal generation unit is configured to calculate a residual signal by using an HOA signal to be encoded and the reconstructed HOA signal output by the signal reconstruction unit. For example, a calculation method is to obtain a difference between the HOA signal to be encoded and a corresponding sampling point in a sound channel corresponding to the reconstructed HOA signal output by the signal reconstruction unit.

The residual signal output by the residual signal generation unit is an input of the signal compensation unit and the selection unit.

The selection unit is configured to select a virtual speaker signal and/or a residual signal based on configuration information of an encoder and signal class information, for example, selection includes virtual speaker signal selection and residual signal selection.

For example, in order to reduce a quantity of sound channels, a residual signal having less than M sound channels may be selected as a residual signal to be encoded. A low-order residual signal may be selected as the residual signal to be encoded, or a residual signal with high energy may be selected as the residual signal to be encoded.

The residual signal output by the selection unit is an input of the core encoder processing unit and an input of the signal compensation unit.

The signal compensation unit is configured to perform signal compensation for a residual signal that is not transmitted because signal loss occurs when the residual signal having less than M sound channels is selected as the residual signal to be encoded compared with that a residual signal having M sound channels serves as the residual signal to be encoded. The signal compensation may be and is not limited to information loss analysis, energy compensation, envelope compensation, and noise compensation. A compensation method may be linear compensation, nonlinear compensation, or the like. The signal compensation unit generates side information for signal compensation.

The core encoder processing unit is configured to perform core encoder processing on the side information and the aligned virtual speaker signal to obtain a bitstream for transmission.

The core encoder processing includes but is not limited to transformation, quantization, a psychoacoustic model, and bitstream generation, and may process a frequency-domain sound channel or a time-domain sound channel, which is not limited herein.

Figure 9:
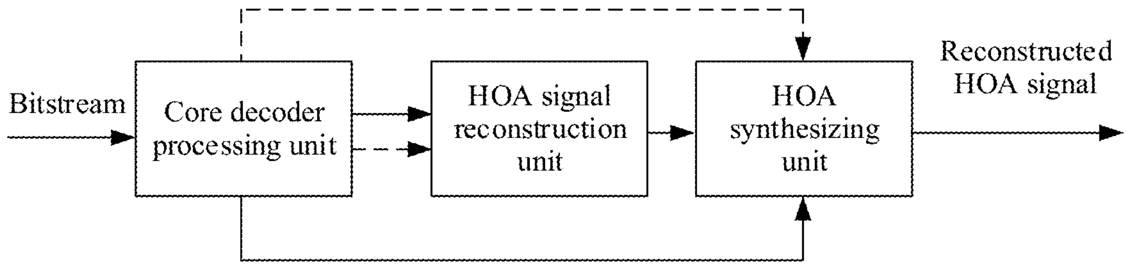
FIG. 9 is a schematic diagram of a structure of another decoder according to an embodiment of this application.

As shown in FIG. 9, the decoder provided in this embodiment of this application may include a core decoder processing unit and an HOA signal reconstruction unit.

The core decoder processing unit is configured to perform core decoder processing on the bitstream for transmission to obtain a virtual speaker signal and a residual signal.

If the encoder adds the side information to the bitstream, the decoder further needs to include a side information decoding unit. This is not limited.

The side information decoding unit is configured to decode to-be-decoded side information output by the core decoder processing unit, to obtain decoded side information.

The core decoder processing may include transformation, bitstream parsing, and dequantization, and may process a frequency-domain sound channel or a time-domain sound channel, which is not limited herein.

The virtual speaker signal and the residual signal output by the core decoder processing unit are used as inputs of the HOA signal reconstruction unit, and the decoded side information output by the core decoder processing unit is an input of the side information decoding unit.

The side information decoding unit converts the decoded side information into an HOA coefficient for a target virtual speaker.

The HOA coefficient for the target virtual speaker output by the side information decoding unit is an input of the HOA signal reconstruction unit.

The HOA signal reconstruction unit is configured to reconstruct the virtual speaker signal by using the residual signal and the HOA coefficient for the target virtual speaker, to obtain a reconstructed HOA signal.

The HOA coefficient for the target virtual speaker is represented by a matrix A'. A size of the matrix A' is (M×C), and the matrix is denoted by A', where C is a quantity of target virtual speakers, and M is a quantity of sound channels of an N-order HOA coefficient. Composition of the virtual speaker signal is of a (C×L) matrix that is denoted by W', where L is a quantity of signal sampling points. A reconstructed HOA signal H is obtained by using the following formula:

$$H=A'W',\ \text{where}$$

the reconstructed HOA signal output by the signal reconstruction unit is an output of the decoder.

In some embodiments of this application, if the bitstream of the encoder further carries side information used for signal compensation, the decoder may further include:

a signal compensation unit, configured to synthesize the reconstructed HOA signal and the residual signal to obtain a synthesized HOA signal. The synthesized HOA signal is adjusted by using the side information used for signal compensation to obtain a reconstructed HOA coefficient.

In this embodiment of this application, the encoder may use the spatial encoder to represent the original HOA signal by using the fewer sound channels. For example, for an original 3-order HOA signal, the spatial encoder in this embodiment of this application can compress 16 sound channels into four sound channels, and ensure that subjective listening is not obviously different. Subjective listening test is an evaluation criterion in audio encoding and decoding. No obvious difference is a level of subjective evaluation.

In some other embodiments of this application, the virtual speaker selection unit of the encoder selects the target virtual speakers from the virtual speaker set, or may use a virtual speaker at a specified direction and location as the target virtual speaker, and the virtual speaker signal generation unit directly performs projection on each target virtual speaker to obtain the virtual speaker signal.

In the foregoing manner, the virtual speaker at the specified direction and location is used as the target virtual speaker. This can simplify a virtual speaker selection process, and improve an encoding and decoding speed.

In some other embodiments of this application, the encoder may not include the signal alignment unit. In this case, an output of the virtual speaker signal generation unit is directly encoded by the core encoder. The foregoing manner reduces signal alignment processing, and reduces complexity of the encoder is reduced.

It can be learned from the description in the foregoing examples that, in embodiments of this application, the selected target virtual speaker is applied to encoding and decoding of an HOA signal. In embodiments of this application, accurate locating of a sound source of the HOA signal can be obtained, a direction for reconstructing the HOA signal is more accurate, encoding efficiency is higher, and complexity of the decoder is very low. This is beneficial to application on a mobile terminal and can improve performance of encoding and decoding.

It should be noted that, for brief description, the foregoing method embodiments are represented as a series of actions. However, a person skilled in the art should appreciate that this application is not limited to the described order of the actions, because according to this application, some operations may be performed in other orders or simultaneously. It should be further appreciated by a person skilled in the art that embodiments described in this specification all belong to example embodiments, and the involved actions and modules are not necessarily required by this application.

To better implement the solutions of embodiments of this application, a related apparatus for implementing the solutions is further provided below.

Figure 10:
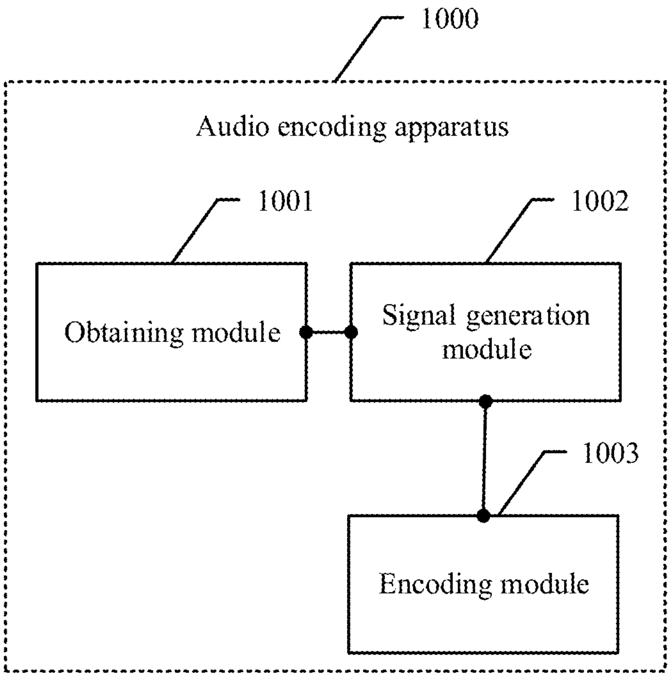
FIG. 10 is a schematic diagram of a composition structure of an audio encoding apparatus according to an embodiment of this application.

As shown in FIG. 10, an audio encoding apparatus 1000 provided in an embodiment of this application may include an obtaining module 1001, a signal generation module 1002, and an encoding module 1003.

The obtaining module is configured to select a first target virtual speaker from a preset virtual speaker set based on a first scene audio signal.

The signal generation module is configured to generate a virtual speaker signal based on the first scene audio signal and attribute information of the first target virtual speaker.

The signal generation module is configured to obtain a second scene audio signal by using the attribute information of the first target virtual speaker and the first virtual speaker signal.

The signal generation module is configured to generate a residual signal based on the first scene audio signal and the second scene audio signal.

The encoding module is configured to encode the virtual speaker signal and the residual signal to obtain a bitstream.

In some embodiments of this application, the obtaining module is configured to: obtain a major sound field component from the first scene audio signal based on the virtual speaker set; and select the first target virtual speaker from the virtual speaker set based on the major sound field component.

In some embodiments of this application, the obtaining module is configured to: select an HOA coefficient for the major sound field component from a higher order ambisonics HOA coefficient set based on the major sound field component, where HOA coefficients in the HOA coefficient set are in a one-to-one correspondence with virtual speakers in the virtual speaker set; and determine a virtual speaker corresponding to the HOA coefficient for the major sound field component in the virtual speaker set as the first target virtual speaker.

In some embodiments of this application, the obtaining module is configured to: obtain a configuration parameter of the first target virtual speaker based on the major sound field component; generate an HOA coefficient for the first target virtual speaker based on the configuration parameter of the first target virtual speaker; and determine a virtual speaker corresponding to the HOA coefficient for the first target virtual speaker in the virtual speaker set as the first target virtual speaker.

In some embodiments of this application, the obtaining module is configured to: determine configuration parameters of a plurality of virtual speakers in the virtual speaker set based on configuration information of an audio encoder; and select the configuration parameter of the first target virtual speaker from the configuration parameters of the plurality of virtual speakers based on the major sound field component.

In some embodiments of this application, the configuration parameter of the first target virtual speaker includes location information and HOA order information of the first target virtual speaker.

The obtaining module is configured to determine the HOA coefficient for the first target virtual speaker based on the location information and the HOA order information of the first target virtual speaker.

In some embodiments of this application, the encoding module is further configured to encode the attribute information of the first target virtual speaker, and write encoded information into the bitstream.

In some embodiments of this application, the first scene audio signal includes a higher order ambisonics HOA signal to be encoded, and the attribute information of the first target virtual speaker includes an HOA coefficient for the first target virtual speaker.

The signal generation module is configured to perform linear combination on the HOA signal to be encoded and the HOA coefficient for the first target virtual speaker to obtain the first virtual speaker signal.

In some embodiments of this application, the first scene audio signal includes a higher order ambisonics HOA signal to be encoded, and the attribute information of the first target virtual speaker includes the location information of the first target virtual speaker.

The signal generation module is configured to: obtain the HOA coefficient for the first target virtual speaker based on the location information of the first target virtual speaker; and perform linear combination on the HOA signal to be encoded and the HOA coefficient for the first target virtual speaker to obtain the first virtual speaker signal.

In some embodiments of this application, the obtaining module is configured to select a second target virtual speaker from the virtual speaker set based on the first scene audio signal.

The signal generation module is configured to generate a second virtual speaker signal based on the first scene audio signal and attribute information of the second target virtual speaker.

The encoding module is configured to encode the second virtual speaker signal, and write an encoded signal into the bitstream.

In an embodiment, the signal generation module is configured to obtain the second scene audio signal based on the attribute information of the first target virtual speaker, the first virtual speaker signal, the attribute information of the second target virtual speaker, and the second virtual speaker signal.

In some embodiments of this application, the signal generation module is configured to align the first virtual speaker signal and the second virtual speaker signal, to obtain an aligned first virtual speaker signal and an aligned second virtual speaker signal.

In an embodiment, the encoding module is configured to encode the aligned second virtual speaker signal.

In an embodiment, the encoding module is configured to encode the aligned first virtual speaker signal and the residual signal.

In some embodiments of this application, the obtaining module is configured to select a second target virtual speaker from the virtual speaker set based on the first scene audio signal.

The signal generation module is configured to generate a second virtual speaker signal based on the first scene audio signal and attribute information of the second target virtual speaker.

In an embodiment, the encoding module is configured to obtain a downmixed signal and first side information based on the first virtual speaker signal and the second virtual speaker signal. The first side information indicates a relationship between the first virtual speaker signal and the second virtual speaker signal.

In an embodiment, the encoding module is configured to encode the downmixed signal, the first side information, and the residual signal.

In some embodiments of this application, the signal generation module is configured to align the first virtual speaker signal and the second virtual speaker signal, to obtain an aligned first virtual speaker signal and an aligned second virtual speaker signal.

The encoding module is configured to obtain the downmixed signal and the first side information based on the aligned first virtual speaker signal and the aligned second virtual speaker signal.

In an embodiment, the first side information indicates a relationship between the aligned first virtual speaker signal and the aligned second virtual speaker signal.

In some embodiments of this application, the obtaining module is configured to: before selecting the second target virtual speaker from the virtual speaker set based on the first scene audio signal, determine, based on an encoding rate and/or signal class information of the first scene audio signal, whether a target virtual speaker other than the first target virtual speaker needs to be obtained; and select the second target virtual speaker from the virtual speaker set based on the first scene audio signal only if the target virtual speaker other than the first target virtual speaker needs to be obtained.

In some embodiments of this application, the residual signal includes residual sub-signals on at least two sound channels.

The signal generation module is configured to determine, from the residual sub-signals on the at least two sound channels based on the configuration information of the audio encoder and/or the signal class information of the first scene audio signal, a residual sub-signal that needs to be encoded and that is on at least one sound channel.

In an embodiment, the encoding module is configured to encode the first virtual speaker signal and the residual sub-signal that needs to be encoded and that is on the at least one sound channel.

In some embodiments of this application, the obtaining module is configured to obtain second side information if the residual sub-signals on the at least two sound channels include a residual sub-signal that does not need to be encoded and that is on at least one sound channel. The second side information indicates a relationship between the residual sub-signal that needs to be encoded and that is on the at least one sound channel and the residual sub-signal that does not need to be encoded and that is on the at least one sound channel.

In an embodiment, the encoding module is configured to write the second side information into the bitstream.

Figure 11:
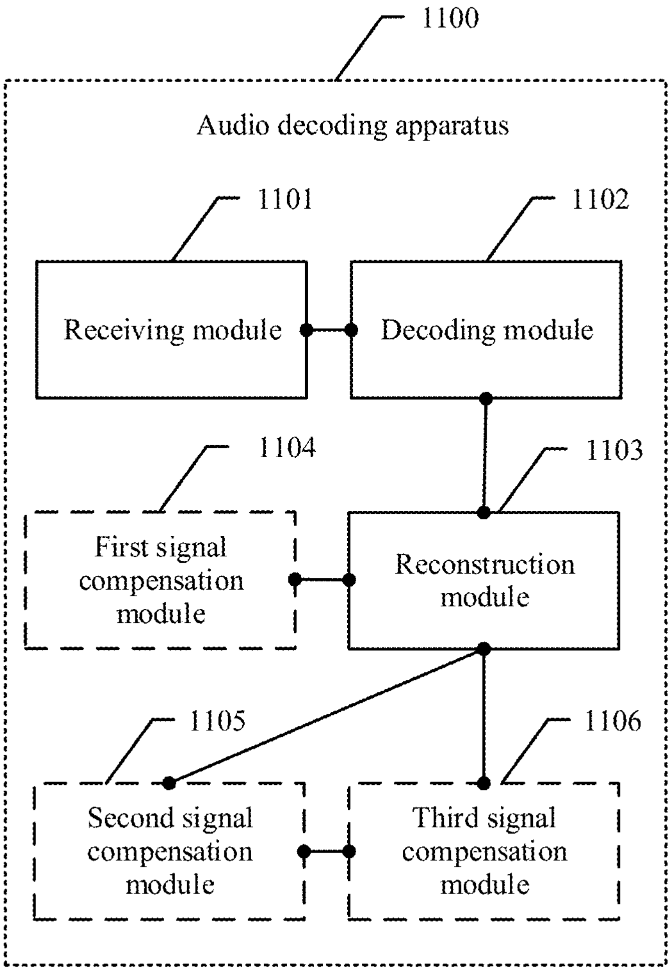
FIG. 11 is a schematic diagram of a composition structure of an audio decoding apparatus according to an embodiment of this application.

As shown in FIG. 11, an audio decoding apparatus 1100 provided in an embodiment of this application may include a receiving module 1101, a decoding module 1102, and a reconstruction module 1103.

The receiving module is configured to receive a bitstream.

The decoding module is configured to decode the bitstream to obtain a virtual speaker signal and a residual signal.

The reconstruction module is configured to obtain a reconstructed scene audio signal based on attribute information of a target virtual speaker, the residual signal, and the virtual speaker signal.

In some embodiments of this application, the decoding module is further configured to decode the bitstream to obtain the attribute information of the target virtual speaker.

In some embodiments of this application, the attribute information of the target virtual speaker includes a higher order ambisonics HOA coefficient for the target virtual speaker.

The reconstruction module is configured to: perform synthesis processing on the virtual speaker signal and the HOA coefficient for the target virtual speaker to obtain a synthesized scene audio signal; and adjust the synthesized scene audio signal by using the residual signal to obtain the reconstructed scene audio signal.

In some embodiments of this application, the attribute information of the target virtual speaker includes location information of the target virtual speaker.

The reconstruction module is configured to: determine an HOA coefficient for the target virtual speaker based on the location information of the target virtual speaker; perform synthesis processing on the virtual speaker signal and the HOA coefficient for the target virtual speaker to obtain a synthesized scene audio signal; and adjust the synthesized scene audio signal by using the residual signal to obtain the reconstructed scene audio signal.

In some embodiments of this application, as shown in FIG. 11, the virtual speaker signal is a downmixed signal obtained by downmixing a first virtual speaker signal and a second virtual speaker signal. The apparatus 1100 further includes a first signal compensation module 1104.

The decoding module is configured to decode the bitstream to obtain first side information. The first side information indicates a relationship between the first virtual speaker signal and the second virtual speaker signal.

The first signal compensation module is configured to obtain the first virtual speaker signal and the second virtual speaker signal based on the first side information and the downmixed signal.

In an embodiment, the reconstruction module is configured to obtain the reconstructed scene audio signal based on the attribute information of the target virtual speaker, the residual signal, the first virtual speaker signal, and the second virtual speaker signal.

In some embodiments of this application, as shown in FIG. 11, the residual signal includes a residual sub-signal on a first sound channel. The apparatus 1100 further includes a second signal compensation module 1105.

The decoding module is configured to decode the bitstream to obtain second side information. The second side information indicates a relationship between the residual sub-signal on the first sound channel and a residual sub-signal on a second sound channel.

The second signal compensation module is configured to obtain the residual sub-signal on the second sound channel based on the second side information and the residual sub-signal on the first sound channel.

In an embodiment, the reconstruction module is configured to obtain the reconstructed scene audio signal based on the attribute information of the target virtual speaker, the residual sub-signal on the first sound channel, the residual sub-signal on the second sound channel, and the virtual speaker signal.

In some embodiments of this application, as shown in FIG. 11, the residual signal includes a residual sub-signal on a first sound channel. The apparatus 1100 further includes a third signal compensation module 1106.

The decoding module is configured to decode the bitstream to obtain second side information. The second side information indicates a relationship between the residual sub-signal on the first sound channel and a residual sub-signal on a third sound channel.

The third signal compensation module is configured to obtain the residual sub-signal on the third sound channel and an updated residual sub-signal on the first sound channel based on the second side information and the residual sub-signal on the first sound channel.

In an embodiment, the reconstruction module is configured to obtain the reconstructed scene audio signal based on the attribute information of the target virtual speaker, the updated residual sub-signal on the first sound channel, the residual sub-signal on the third sound channel, and the virtual speaker signal.

It should be noted that content such as information exchange between the modules/units of the apparatus and the execution processes thereof is based on the same idea as the method embodiments of this application, and produces the same technical effects as the method embodiments of this application. For specific content, refer to the foregoing description in the method embodiments of this application, and details are not described herein again.

An embodiment of this application further provides a computer storage medium. The computer storage medium stores a program, and the program performs some or all of the operations described in the foregoing method embodiments.

Figure 12:
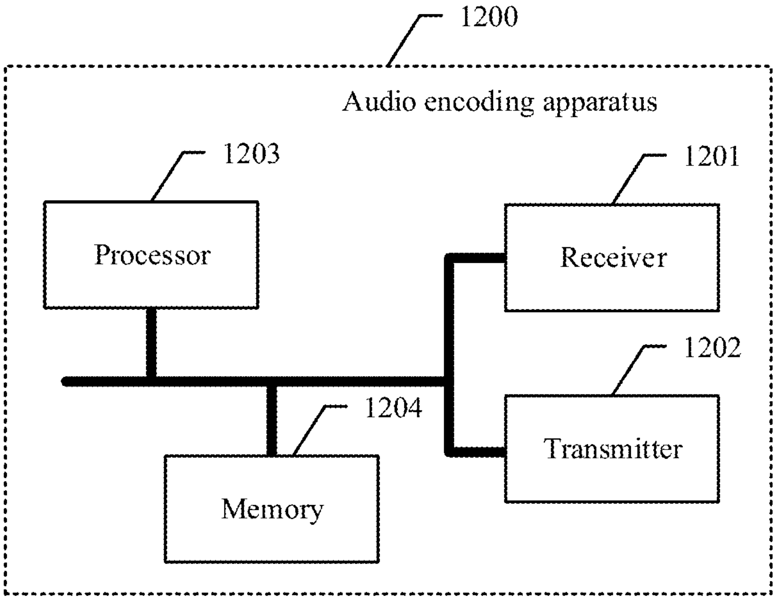
FIG. 12 is a schematic diagram of a composition structure of another audio encoding apparatus according to an embodiment of this application.

The following describes another audio encoding apparatus provided in an embodiment of this application. As shown in FIG. 12, the audio encoding apparatus 1200 includes:

a receiver 1201, a transmitter 1202, a processor 1203, and a memory 1204 (there may be one or more processors 1203 in the audio encoding apparatus 1200, and one processor is used as an example in FIG. 12). In some embodiments of this application, the receiver 1201, the transmitter 1202, the processor 1203, and the memory 1204 may be connected through a bus or in another manner. In FIG. 12, connection through a bus is used as an example.

The memory 1204 may include a read-only memory and a random access memory, and provide instructions and data to the processor 1203. A part of the memory 1204 may further include a non-volatile random access memory (NVRAM). The memory 1204 stores an operating system and operation instructions, an executable module or a data structure, or a subset thereof, or an extended set thereof. The operation instructions may include various operation instructions used to implement various operations. The operating system may include various system programs, to implement various basic services and process a hardware-based task.

The processor 1203 controls operations of the audio encoding apparatus, and the processor 1203 may also be referred to as a central processing unit (CPU). In an embodiment, components of the audio encoding apparatus are coupled together through a bus system. In addition to a data bus, the bus system may further include a power bus, a control bus, a status signal bus, and the like. However, for clear description, various types of buses in the figure are marked as the bus system.

The methods disclosed in embodiments of this application may be applied to the processor 1203, or may be implemented by using the processor 1203. The processor 1203 may be an integrated circuit chip and has a signal processing capability. In an embodiment, the operations in the foregoing methods may be completed by using an integrated logic circuit of hardware in the processor 1203 or an instruction in a form of software. The processor 1203 may be a general-purpose processor, a digital signal processor (DSP), an application-specific integrated circuit (ASIC), a field-programmable gate array (FPGA) or another programmable logic device, a discrete gate or transistor logic device, or a discrete hardware component. It may implement or perform the methods, the operations, and logical block diagrams that are disclosed in embodiments of this application. The general-purpose processor may be a microprocessor, or the processor may alternatively be any conventional processor or the like. Operations of the methods disclosed with reference to embodiments of this application may be directly executed and accomplished by a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1204, and the processor 1203 reads information in the memory 1204 and completes the operations in the foregoing methods in combination with hardware of the processor.

The receiver 1201 may be configured to: receive input digital or character information, and generate a signal input related to a related setting and function control of the audio encoding apparatus. The transmitter 1202 may include a display device such as a display screen, and the transmitter 1202 may be configured to output digital or character information through an external interface.

In this embodiment of this application, the processor 1203 is configured to perform the audio encoding method performed by the audio encoding apparatus in the foregoing embodiment shown in FIG. 4.

Figure 13:
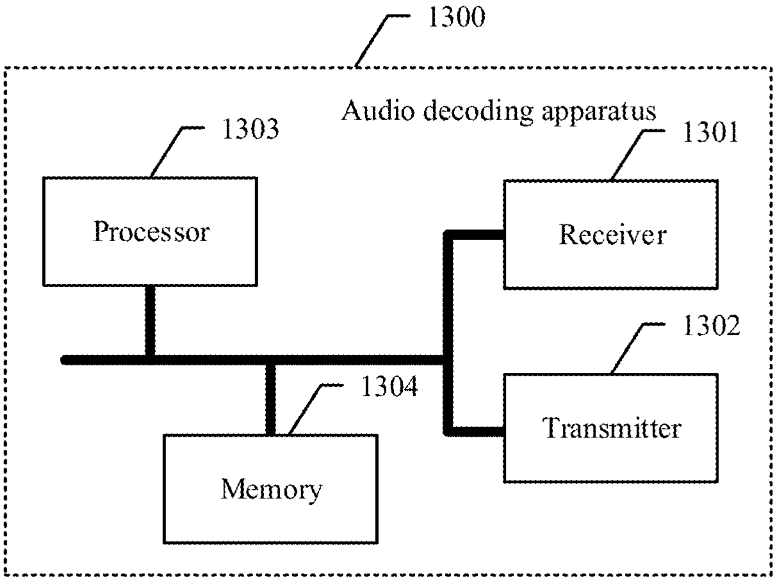
FIG. 13 is a schematic diagram of a composition structure of another audio decoding apparatus according to an embodiment of this application.

The following describes another audio decoding apparatus provided in an embodiment of this application. As shown in FIG. 13, the audio decoding apparatus 1300 includes:

a receiver 1301, a transmitter 1302, a processor 1303, and a memory 1304 (there may be one or more processors 1303 in the audio decoding apparatus 1300, and one processor is used as an example in FIG. 13). In some embodiments of this application, the receiver 1301, the transmitter 1302, the processor 1303, and the memory 1304 may be connected through a bus or in another manner. In FIG. 13, connection through a bus is used as an example.

The memory 1304 may include a read-only memory and a random access memory, and provide instructions and data to the processor 1303. A part of the memory 1304 may further include an NVRAM. The memory 1304 stores an operating system and operation instructions, an executable module or a data structure, or a subset thereof, or an extended set thereof. The operation instructions may include various operation instructions used to implement various operations. The operating system may include various system programs, to implement various basic services and process a hardware-based task.

The processor 1303 controls operations of the audio decoding apparatus, and the processor 1303 may also be referred to as a CPU. In an embodiment, components of the audio decoding apparatus are coupled together through a bus system. In addition to a data bus, the bus system may further include a power bus, a control bus, a status signal bus, and the like. However, for clear description, various types of buses in the figure are marked as the bus system.

The methods disclosed in embodiments of this application may be applied to the processor 1303, or may be implemented by using the processor 1303. The processor 1303 may be an integrated circuit chip, and has a signal processing capability. In an embodiment, the operations in the foregoing methods may be completed by using an integrated logic circuit of hardware in the processor 1303 or an instruction in a form of software. The processor 1303 may be a general-purpose processor, a DSP, an ASIC, an FPGA or another programmable logic device, a discrete gate or transistor logic device, or a discrete hardware component. It may implement or perform the methods, the operations, and logical block diagrams that are disclosed in embodiments of this application. The general-purpose processor may be a microprocessor, or the processor may alternatively be any conventional processor or the like. Operations of the methods disclosed with reference to embodiments of this application may be directly executed and accomplished by a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1304, and the processor 1303 reads information in the memory 1304 and completes the operations in the foregoing methods in combination with hardware of the processor.

In this embodiment of this application, the processor 1303 is configured to perform the audio decoding method performed by the audio decoding apparatus in the foregoing embodiment shown in FIG. 4.

In another possible design, when the audio encoding apparatus or the audio decoding apparatus is a chip in a terminal, the chip includes a processing unit and a communication unit. The processing unit may be, for example, a processor. The communication unit may be, for example, an input/output interface, a pin, or a circuit. The processing unit may execute computer-executable instructions stored in a storage unit, to enable the chip in the terminal to perform the audio encoding method in any one of the first aspect or the audio decoding method in any one of the second aspect. In an embodiment, the storage unit is a storage unit in the chip, for example, a register or a cache. Alternatively, the storage unit may be a storage unit that is in the terminal and that is located outside the chip, for example, a read-only memory (ROM), another type of static storage device that can store static information and instructions, or a random access memory (RAM).

The processor mentioned anywhere above may be a general-purpose central processing unit, a microprocessor, an ASIC, or one or more integrated circuits configured to control program execution of the method in the first aspect or the second aspect.

In addition, it should be noted that the described apparatus embodiments are merely examples. The units described as separate parts may or may not be physically separate, and parts displayed as units may or may not be physical units, may be located in one position, or may be distributed on a plurality of network units. Some or all of the modules may be selected based on actual needs to achieve the objectives of the solutions in embodiments. In addition, in the accompanying drawings of the apparatus embodiments provided by this application, connection relationships between modules indicate that the modules have communication connections with each other, which may be implemented as one or more communication buses or signal cables.

Based on the description of the foregoing embodiments, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any function that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium, for example, a floppy disk, a USB flash drive, a removable hard disk, a ROM, a RAM, a magnetic disk, or an optical disc of a computer, and includes several instructions for instructing a computer device (which may be a personal computer, a server, a network device, or the like) to perform the methods described in embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A method of audio encoding performed by an audio encoder, comprising:

selecting a first target virtual speaker from a preset virtual speaker set based on a first scene audio signal;

generating a first virtual speaker signal based on the first scene audio signal and attribute information of the first target virtual speaker;

obtaining a second scene audio signal using the attribute information of the first target virtual speaker and the first virtual speaker signal;

generating a residual signal based on the first scene audio signal and the second scene audio signal; and encoding the first virtual speaker signal and the residual signal, to produce encoded signals, and writing the encoded signals into a bitstream;

wherein the first scene audio signal comprises a higher order ambisonics (HOA) signal to be encoded, and the attribute information of the first target virtual speaker comprises location information of the first target virtual speaker; and generating the first virtual speaker signal comprises:

obtaining an HOA coefficient for the first target virtual speaker based on the location information of the first target virtual speaker; and performing linear combination on the HOA signal to be encoded and the HOA coefficient for the first target virtual speaker to obtain the first virtual speaker signal.

2. The method according to claim 1, wherein the method further comprises:

obtaining a major sound field component from the first scene audio signal based on the preset virtual speaker set; and selecting the first target virtual speaker from the preset virtual speaker set comprises:

selecting the first target virtual speaker from the virtual speaker set based on the major sound field component.

3. The method according to claim 1, further comprising:

encoding the attribute information of the first target virtual speaker, and writing the encoded attribute information into the bitstream.

4. The method according to claim 1, wherein the method further comprises:

selecting a second target virtual speaker from the preset virtual speaker set based on the first scene audio signal; and generating a second virtual speaker signal based on the first scene audio signal and attribute information of the second target virtual speaker; and encoding the first virtual speaker signal and the residual signal comprises:

obtaining a downmixed signal and first side information based on the first virtual speaker signal and the second virtual speaker signal, wherein the first side information indicates a relationship between the first virtual speaker signal and the second virtual speaker signal; and encoding the downmixed signal, the first side information, and the residual signal.

5. The method according to claim 1, wherein the residual signal comprises residual sub-signals on at least two sound channels, and the method further comprises:

determining, from the residual sub-signals on the at least two sound channels based on configuration information of an audio encoder or signal class information of the first scene audio signal, a residual sub-signal that needs to be encoded and that is on at least one sound channel; and encoding the first virtual speaker signal and the residual signal comprises:

encoding the first virtual speaker signal and the residual sub-signal that needs to be encoded and that is on the at least one sound channel.

6. The method according to claim 5, further comprising:

when the residual sub-signals on the at least two sound channels comprise a residual sub-signal that does not need to be encoded and that is on at least one sound channel, obtaining second side information that indicates a relationship between the residual sub-signal that needs to be encoded and that is on the at least one sound channel and the residual sub-signal that does not need to be encoded and that is on the at least one sound channel; and writing the second side information into the bitstream.

7. A method of audio decoding performed by an audio decoder, comprising:

receiving a bitstream;

decoding the bitstream to obtain a virtual speaker signal and a residual signal;

decoding the bitstream to obtain attribute information of a target virtual speaker; and obtaining a reconstructed scene audio signal based on the attribute information of the target virtual speaker, the residual signal, and the virtual speaker signal;

wherein the attribute information of the target virtual speaker comprises location information of the target virtual speaker; and obtaining the reconstructed scene audio signal comprises:

determining a higher order ambisonics (HOA) coefficient for the target virtual speaker based on the location information of the target virtual speaker;

performing synthesis processing on the virtual speaker signal and the HOA coefficient for the target virtual speaker to obtain a synthesized scene audio signal; and adjusting the synthesized scene audio signal using the residual signal to obtain the reconstructed scene audio signal.

8. The method according to claim 7, wherein the virtual speaker signal is a downmixed signal obtained by downmixing a first virtual speaker signal and a second virtual speaker signal;

the method further comprises:

decoding the bitstream to obtain first side information, wherein the first side information indicates a relationship between the first virtual speaker signal and the second virtual speaker signal; and obtaining the first virtual speaker signal and the second virtual speaker signal based on the first side information and the downmixed signal; and obtaining the reconstructed scene audio signal comprises:

obtaining the reconstructed scene audio signal based on the attribute information of the target virtual speaker, the residual signal, the first virtual speaker signal, and the second virtual speaker signal.

9. The method according to claim 7, wherein the residual signal comprises a residual sub-signal on a first sound channel;

the method further comprises:

decoding the bitstream to obtain second side information, wherein the second side information indicates a relationship between the residual sub-signal on the first sound channel and a residual sub-signal on a second sound channel; and obtaining the residual sub-signal on the second sound channel based on the second side information and the residual sub-signal on the first sound channel; and obtaining the reconstructed scene audio signal comprises:

obtaining the reconstructed scene audio signal based on the attribute information of the target virtual speaker, the residual sub-signal on the first sound channel, the residual sub-signal on the second sound channel, and the virtual speaker signal.

10. The method according to claim 7, wherein the residual signal comprises a residual sub-signal on a first sound channel;

the method further comprises:

decoding the bitstream to obtain second side information, wherein the second side information indicates a relationship between the residual sub-signal on the first sound channel and a residual sub-signal on a third sound channel; and obtaining the residual sub-signal on the third sound channel and an updated residual sub-signal on the first sound channel based on the second side information and the residual sub-signal on the first sound channel; and obtaining the reconstructed scene audio signal comprises:

obtaining the reconstructed scene audio signal based on the attribute information of the target virtual speaker, the updated residual sub-signal on the first sound channel, the residual sub-signal on the third sound channel, and the virtual speaker signal.

11. An audio encoder apparatus, comprising:

at least one processor coupled to a memory storing instructions, which when executed by the at least one processor, cause the audio encoder to perform operations, the operations comprising:

selecting a first target virtual speaker from a preset virtual speaker set based on a first scene audio signal;

generating a first virtual speaker signal based on the first scene audio signal and attribute information of the first target virtual speaker;

obtaining a second scene audio signal using the attribute information of the first target virtual speaker and the first virtual speaker signal;

generating a residual signal based on the first scene audio signal and the second scene audio signal; and encoding the first virtual speaker signal and the residual signal, to produce encoded signals, and writing the encoded signals into a bitstream;

wherein the first scene audio signal comprises a higher order ambisonics (HOA) signal to be encoded, and the attribute information of the first target virtual speaker comprises location information of the first target virtual speaker; and generating the first virtual speaker signal comprises:

obtaining an HOA coefficient for the first target virtual speaker based on the location information of the first target virtual speaker; and performing linear combination on the HOA signal to be encoded and the HOA coefficient for the first target virtual speaker to obtain the first virtual speaker signal.

12. The audio encoder according to claim 11, wherein the operations further comprise:

encoding the attribute information of the first target virtual speaker, and writing the encoded attribute information into the bitstream.

13. The audio encoder according to claim 11, wherein the operations further comprise:

selecting a second target virtual speaker from the preset virtual speaker set based on the first scene audio signal; and generating a second virtual speaker signal based on the first scene audio signal and attribute information of the second target virtual speaker; and encoding the first virtual speaker signal and the residual signal comprises:

obtaining a downmixed signal and first side information based on the first virtual speaker signal and the second virtual speaker signal, wherein the first side information indicates a relationship between the first virtual speaker signal and the second virtual speaker signal; and encoding the downmixed signal, the first side information, and the residual signal.

14. An audio decoder, comprising:

at least one processor coupled to a memory storing instructions, which when executed by the at least one processor, cause the audio decoder to perform operations, the operations comprising:

receiving a bitstream;

decoding the bitstream to obtain a virtual speaker signal and a residual signal;

decoding the bitstream to obtain attribute information of a target virtual speaker; and obtaining a reconstructed scene audio signal based on the attribute information of the target virtual speaker, the residual signal, and the virtual speaker signal;

wherein the attribute information of the target virtual speaker comprises location information of the target virtual speaker; and obtaining the reconstructed scene audio signal comprises:

determining a higher order ambisonics (HOA) coefficient for the target virtual speaker based on the location information of the target virtual speaker;

performing synthesis processing on the virtual speaker signal and the HOA coefficient for the target virtual speaker to obtain a synthesized scene audio signal; and adjusting the synthesized scene audio signal using the residual signal to obtain the reconstructed scene audio signal.

* * * * *